United States Patent
Yokoyama

(10) Patent No.: US 9,703,580 B2
(45) Date of Patent: Jul. 11, 2017

(54) INFORMATION PROCESSING APPARATUS, INFORMATION PROCESSING SYSTEM, AND COMMUNICATION DATA OUTPUT METHOD

(71) Applicant: FUJITSU LIMITED, Kawasaki-shi, Kanagawa (JP)

(72) Inventor: Ken Yokoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 371 days.

(21) Appl. No.: 14/322,979

(22) Filed: Jul. 3, 2014

(65) Prior Publication Data

US 2014/0317623 A1  Oct. 23, 2014

Related U.S. Application Data

(63) Continuation of application No. PCT/JP2012/051880, filed on Jan. 27, 2012.

(51) Int. Cl.
| | |
|---|---|
| *G06F 15/173* | (2006.01) |
| *G06F 9/455* | (2006.01) |
| *H04L 12/931* | (2013.01) |
| *H04L 12/801* | (2013.01) |
| *H04L 12/26* | (2006.01) |

(52) U.S. Cl.
CPC .............. *G06F 9/455* (2013.01); *H04L 43/04* (2013.01); *H04L 43/12* (2013.01); *H04L 47/10* (2013.01); *H04L 49/208* (2013.01)

(58) Field of Classification Search
CPC ...... H04L 49/208; H04L 43/00–43/045; G06F 9/45558; G06F 2009/45591–2009/45595
See application file for complete search history.

(56) References Cited

U.S. PATENT DOCUMENTS

| | | | | |
|---|---|---|---|---|
| 6,041,042 A | * | 3/2000 | Bussiere | H04L 12/24 370/245 |
| 7,626,938 B1 | * | 12/2009 | Orr | H04L 12/2602 370/251 |
| 7,782,784 B2 | * | 8/2010 | Agrawal | H04L 43/026 370/236.2 |
| 8,520,540 B1 | * | 8/2013 | Foschiano | H04L 43/0852 370/252 |

(Continued)

FOREIGN PATENT DOCUMENTS

| | | |
|---|---|---|
| JP | 2011-182211 | 9/2011 |
| JP | 2012-004781 | 1/2012 |
| JP | 2012-048629 | 3/2012 |

OTHER PUBLICATIONS

Japanese Office Action mailed on Jun. 16, 2015 for corresponding Japanese Patent Application No. 2013-555095, with Partial English Translation, 4 pages.

(Continued)

*Primary Examiner* — Brendan Higa
(74) *Attorney, Agent, or Firm* — Fujitsu Patent Center

(57) ABSTRACT

An information processing apparatus includes a processor configured to collect data received and transmitted between a plurality of virtual machines within a physical apparatus, the plurality of virtual machines running on the physical apparatus; and a communication unit configured to output the data collected by the processor to an external apparatus.

8 Claims, 19 Drawing Sheets

(56) References Cited

U.S. PATENT DOCUMENTS

| | | | |
|---|---|---|---|
| 2007/0022327 A1* | 1/2007 | Otsuka | G06F 11/3419 714/47.2 |
| 2007/0047456 A1* | 3/2007 | Jorgensen | H04L 45/00 370/250 |
| 2007/0266433 A1 | 11/2007 | Moore | |
| 2008/0028467 A1* | 1/2008 | Kommareddy | H04L 63/1458 726/23 |
| 2010/0091665 A1* | 4/2010 | Yokoyama | H04L 29/12339 370/249 |
| 2010/0223397 A1* | 9/2010 | Elzur | H04L 41/0213 709/235 |
| 2010/0232443 A1 | 9/2010 | Pandey | |
| 2012/0207174 A1* | 8/2012 | Shieh | H04L 47/125 370/401 |
| 2012/0304175 A1* | 11/2012 | Damola | G06F 11/3419 718/1 |
| 2012/0317566 A1* | 12/2012 | Santos | G06F 9/45558 718/1 |
| 2014/0003249 A1* | 1/2014 | Cai | H04L 43/10 370/241 |

OTHER PUBLICATIONS

Extended European Search Report dated May 7, 2015 for corresponding European Patent Application No. 12866923.1, 6 pages.
Nakagawa, Yukihiro et al., "A Single-Chip, 10-Gigabit Ethernet Switch LSI for Energy-Efficient Blade Servers", 2010 IEEE/ACM International Conference on Green Computing and Communications & 2010 IEEE International Conference on Cyber, Physical and Social Computing, Dec. 18, 2010, pp. 404-411, XP031923514.
Shuichiro Aiba et al., "Traffic Control of Virtual Machine using Flow-based Analysis", IEICE Technical Report, ICM2010-36, LOIS2010-47 (Jan. 13, 2011), vol. 110, No. 375, pp. 17 to 22.
International Search Report of Int. Appl. No. PCT/JP2012/051880 dated Mar. 19, 2012.

* cited by examiner

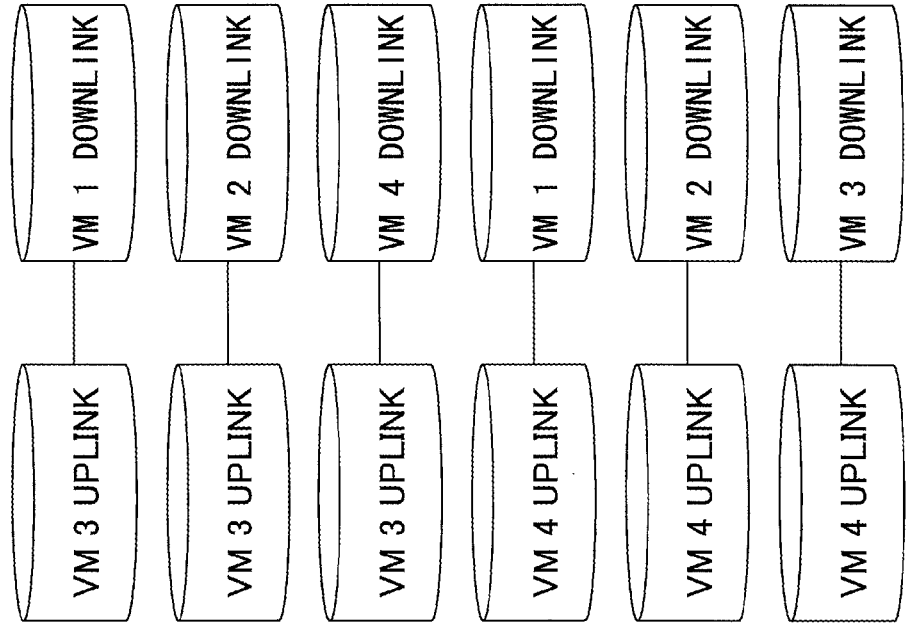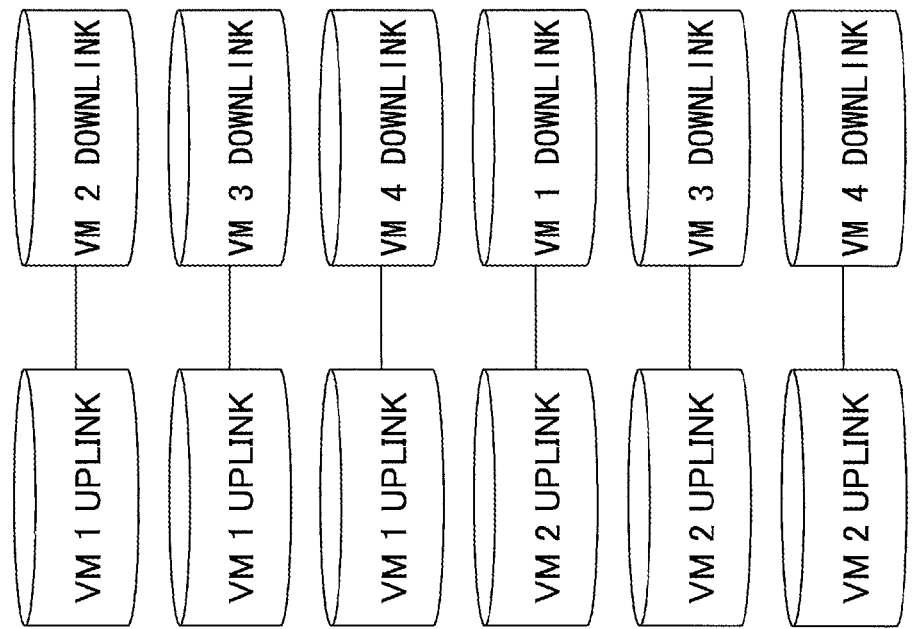
FIG.9

| LEARNED MAC ADDRESS | PORT |
|---|---|
| MAC ADDRESS OF VM 121 | PORT CORRESPONDING TO VIF 111 |
| MAC ADDRESS OF VM 122 | PORT CORRESPONDING TO VIF 112 |
| MAC ADDRESS OF VM 221 | PORT CORRESPONDING TO NIC 130 |

INFORMATION PROCESSING APPARATUS, INFORMATION PROCESSING SYSTEM, AND COMMUNICATION DATA OUTPUT METHOD

CROSS-REFERENCE TO RELATED APPLICATIONS

This application is a continuation application of International Application PCT/JP2012/051880 filed on Jan. 27, 2012 and designated the U.S., the entire contents of which are incorporated herein by reference.

FIELD

The disclosures herein generally relate to an information processing apparatus, an information processing system, a communication data output method, and a communication data output program.

BACKGROUND

Conventionally, in an information processing apparatus such as a server apparatus, a process is executed for collecting information about data that is transmitted to or received from an external device.

For example, a system is disclosed in which multiple server apparatuses are connected with a switch having a port mirroring function, and mirroring is applied to all packets passing through the switch to transmit the packets to a message analysis apparatus. A switch is a device to transfer data in a system, and also called a "switching hub".

RELATED-ART DOCUMENTS

Patent Documents

[Patent Document 1] Japanese Laid-open Patent Publication No. 2011-182211

SUMMARY

According to at least one embodiment of the present invention, an information processing apparatus includes a processor configured to collect data received and transmitted between a plurality of virtual machines within a physical apparatus, the plurality of virtual machines running on the physical apparatus; and a communication unit configured to output the data collected by the processor to an external apparatus.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 9 is a schematic view illustrating combinations of packet comparisons when the number of VMs is four;

FIG. 19 is a schematic view illustrating an example of data stored as a MAC address table 115.

DESCRIPTION OF EMBODIMENTS

In the following, embodiments of the present invention will be described with reference to the accompanying drawings.

Embodiments

First Embodiment

In the following, an information processing apparatus, a communication data output method, a communication data output program, and an information processing system that uses the above components will be described with reference to the accompanying drawings.

Figure 1:
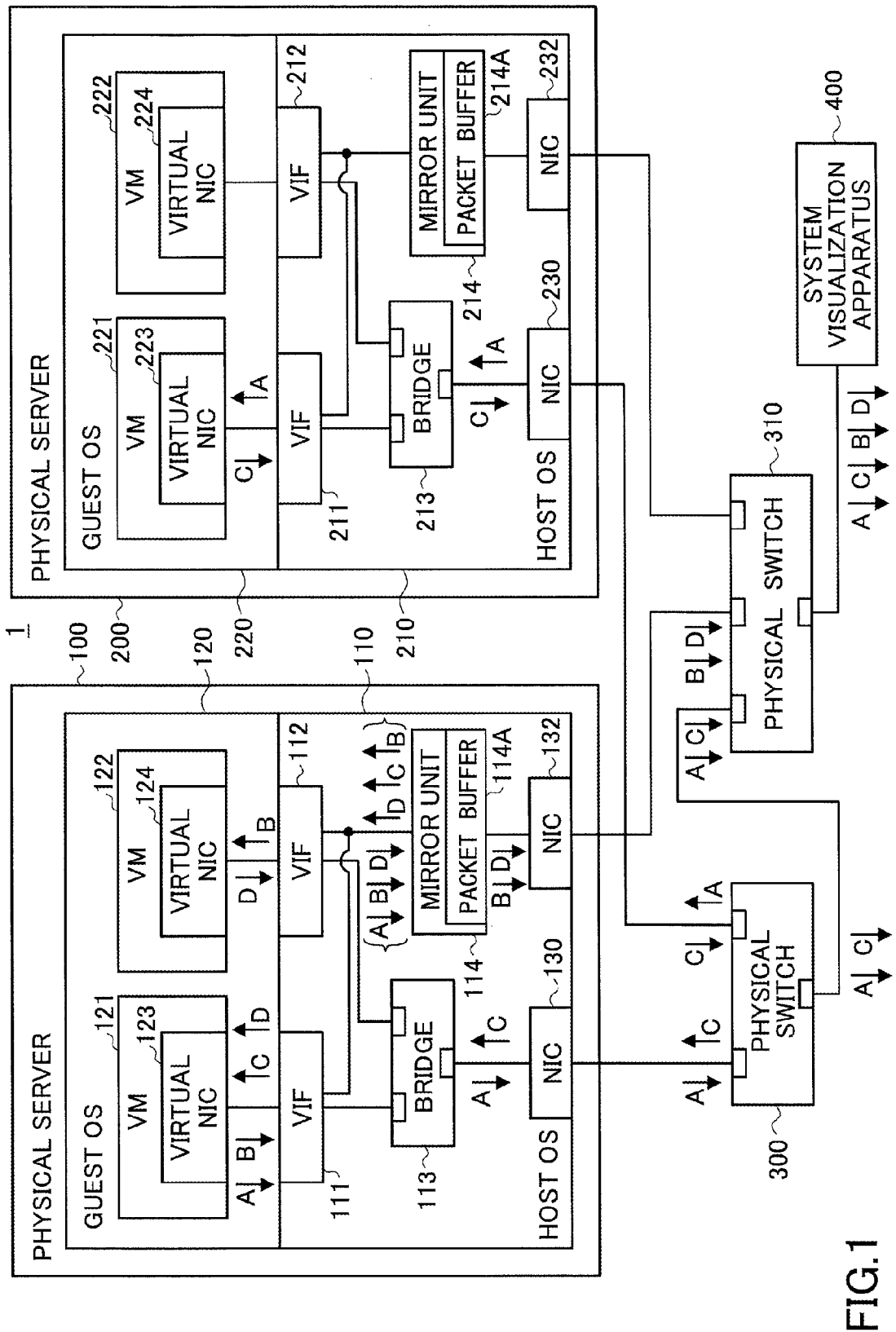
FIG. 1 illustrates an example of a system configuration of an information processing system 1 according to a first embodiment of the present invention.

FIG. 1 illustrates an example of a system configuration of an information processing system 1 according to a first embodiment of the present invention. The information processing system 1 includes physical servers 100 and 200 as examples of information processing apparatuses, physical switches 300 and 310, and a system visualization apparatus 400. In a network formed with the physical servers and the physical switches, a communication protocol is adopted, for example, Ethernet (trademark), IEEE 802.3, FDDI (Fiber-Distributed Data Interface), PPP (Point to Point Protocol), or the like.

Figure 2:
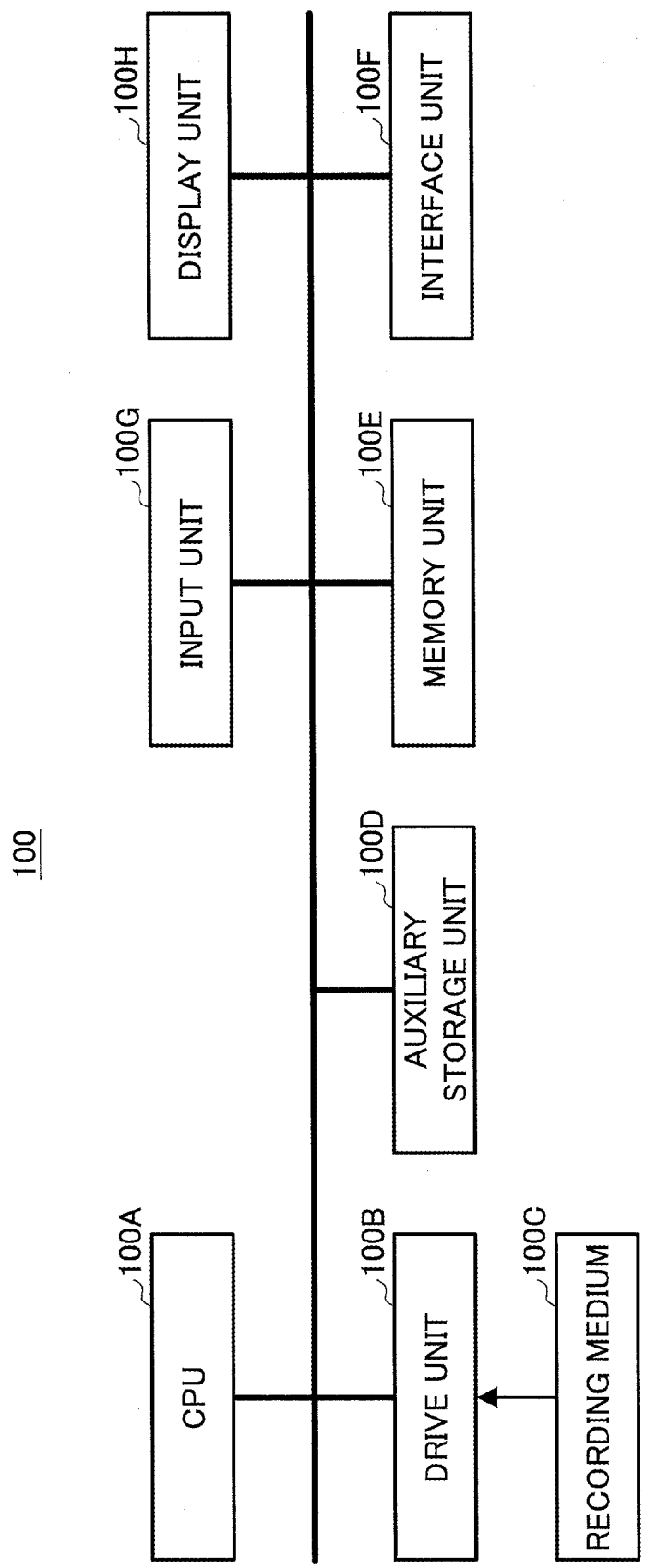
FIG. 2 illustrates an example of a hardware configuration of a physical server 100.

FIG. 2 illustrates an example of a hardware configuration of the physical server 100. The physical server 100 includes, for example, a CPU (Central Processing Unit) 100A, a drive unit 100B, an auxiliary storage unit 100D, a memory unit 100E, an interface unit 100F, an input unit 100G, and a display unit 100H. These elements are connected with each other via a bus, a serial communication channel, or the like.

The CPU 100A is a processor that includes, for example, a program counter, an instruction decoder, various arithmetic units, an LSU (Load/Store Unit), and general-purpose registers.

The drive unit 100B is a unit that can read a program or data from a recording medium 100C. When the recording medium 100C storing a program is mounted on the drive unit 100B, the program is installed from the recording medium 100C to the auxiliary storage unit 100D via the drive unit 100B. The recording medium 100C is a portable recording medium, for example, a CD-ROM, a DVD, a USB memory, or the like. Also, the auxiliary storage unit 100D is, for example, an HDD (Hard Disk Drive) or a flash memory.

Installation of a program can be executed not only by the recording medium 100C as above, but also by the interface unit 100F that downloads a program from another computer via a network and installs the program in the auxiliary storage unit 100D. The network may be the Internet, a LAN (Local Area Network), a wireless network, or the like. Also, a program may be stored beforehand in the auxiliary storage unit 100D, a ROM (Read-Only Memory), or the like at shipment of the physical server 100.

By having the CPU 100A execute the program having been installed or stored beforehand as above, an information processing apparatus as illustrated in FIG. 1 can function as the physical server 100 according to the present embodiment.

The memory unit 100E includes, for example, a RAM (Random Access Memory) and an EEPROM (Electrically Erasable and Programmable Read-Only Memory). The interface unit 100F controls connection with the network.

The input unit 100G includes, for example, a keyboard, a mouse, a touch pad, a touch panel, and a microphone. Also, the display unit 100H is a display device, for example, an LCD (Liquid Crystal Display), a CRT (Cathode Ray Tube), or the like. The physical server 100 may include other types of output units besides the display unit 100H, such as a printer and a loudspeaker.

Note that the physical server 200 can adopt the same hardware configuration as the physical server 100; hence its description is omitted.

Referring to FIG. 1 again, elements of the information processing system 1 will be described.

The physical server 100 is controlled by a host OS (Operating System) 110 and a guest OS 120 runs on the host OS 110. Also, the physical server 100 includes a NIC (Network Interface Card) 130 connected with a physical switch 300, and a NIC 132 connected with a physical switch 310.

Also, the physical server 100 includes software units build on the host OS 110 such as VIFs (Virtual Interfaces) 111 and 112, a bridge 113, and a mirror unit 114.

Also, the physical server 100 includes software units build on the guest OS 120 such as VMs (Virtual Machines or Virtual Computers) 121 and 122. The VMs 121 and 122 include virtual NICs 123 and 124, respectively.

Similarly, the physical server 200 is controlled by a host OS (Operating System) 210 and a guest OS 220 runs on the host OS 210. Also, the physical server 200 includes a NIC (Network Interface Card) 230 connected with the physical switch 300, and a NIC 232 connected with the physical switch 310.

Also, the physical server 200 includes software units build on the host OS 210 such as VIFs (Virtual Interfaces) 211 and 212, a bridge 213, and a mirror unit 214.

Also, the physical server 200 includes software units build on the guest OS 220 such as VMs (Virtual Machines) 221 and 222. The VMs 221 and 222 include virtual NICs 223 and 224, respectively.

The VMs 121, 122, 221, and 222 may have respective functions of, for example, a Web server, an application server, a database server, and the like, to provide various information services to client computers connected with the information processing system 1. Although it is assumed that two VMS exist on each of the physical servers in the present embodiment, any number of VMs may exist on each of the physical servers.

Figure 3:
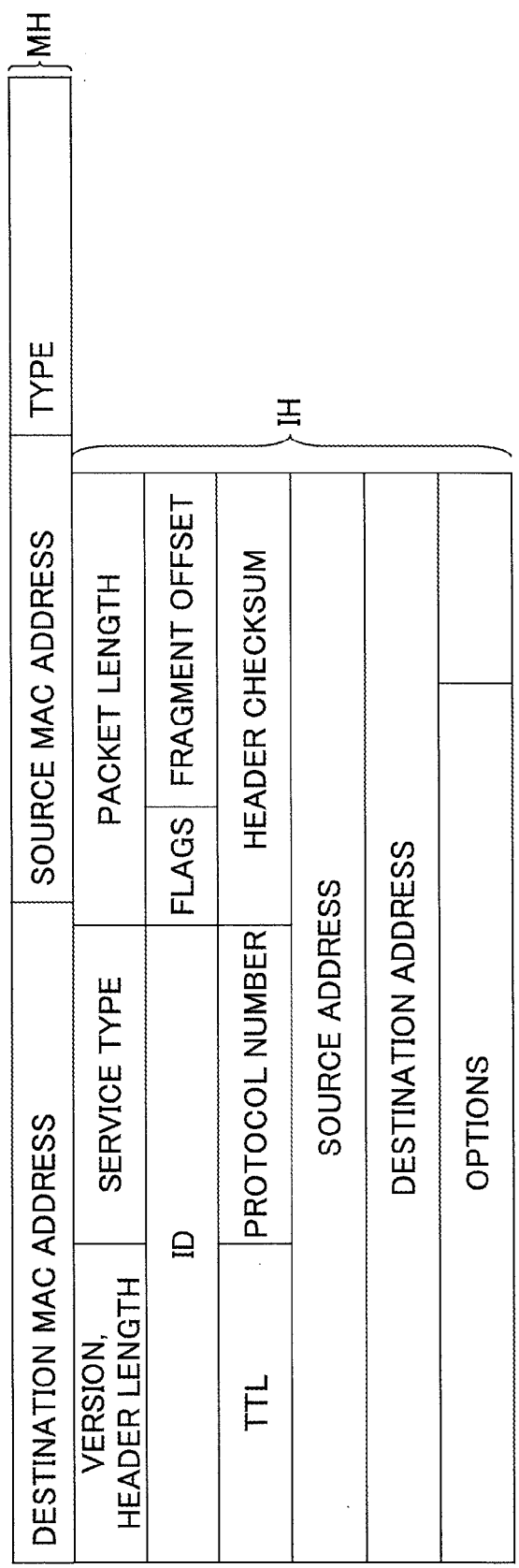
FIG. 3 is a schematic view illustrating content of a MAC header MH and an IP header IH, which are header parts of a packet.

In the information processing system 1, communication between VMs on different physical servers is executed, for example, via the physical switch 300 by units of packets. A packet is an example of a unit of data in the claims. FIG. 3 is a schematic view illustrating content of a MAC header MH and an IP header IH, which are header parts of a packet.

As an example of communication between VMs on different physical servers, when transmitting a packet "A" from the VM 121 to the VM 221, the packet "A" is transferred to the physical switch 300 by the virtual NIC 123, the VIF 111, the bridge 113, and the NIC 130. Then, the packet "A" is transferred to the VM 221 by the physical switch 300, the NIC 230, the bridge 213, the VIF 211, and the virtual NIC 223. The destination of the packet is determined at the bridges 113 and 213, the physical switch 300, and the like, with reference to, for example, a destination MAC address that corresponds to the destination VIF.

On the other hand, communication between VMs on the same physical server is executed via the bridge 113 by units of packets. For example, when transmitting a packet "B" from the VM 121 to the VM 122, the packet "B" is transferred by the virtual NIC 123, the VIF 111, the bridge 113, the VIF 112, and the virtual NIC 124.

The physical switch 300 has a correspondence table (MAC address table, not illustrated) of MAC addresses and ports to transfer packets. Also, the physical switch 300 has a port mirroring function to transmit a copy of a transferred packet to the physical switch 310 (mirroring).

The mirror unit 114 collects packets transmitted/received between VMs on the same physical server, and transmits the collected packets to the NIC 132. The NIC 132 transfers the packets input from the mirror unit 114 to the physical switch 310. The function of the mirror unit 214 is the same as that of the mirror unit 114. The mirrors units 114 and 214 use packet buffers 114A and 214A, respectively.

The physical switch 310 transmits packets input from the physical switch 300 and the NICs 132 and 232 to the system visualization apparatus 400. By these processes, packets transmitted/received between the physical servers or within the physical server are input to the system visualization apparatus 400, and data of all packets transmitted/received in the information processing system 1 are gathered in the system visualization apparatus 400.

Figure 4:
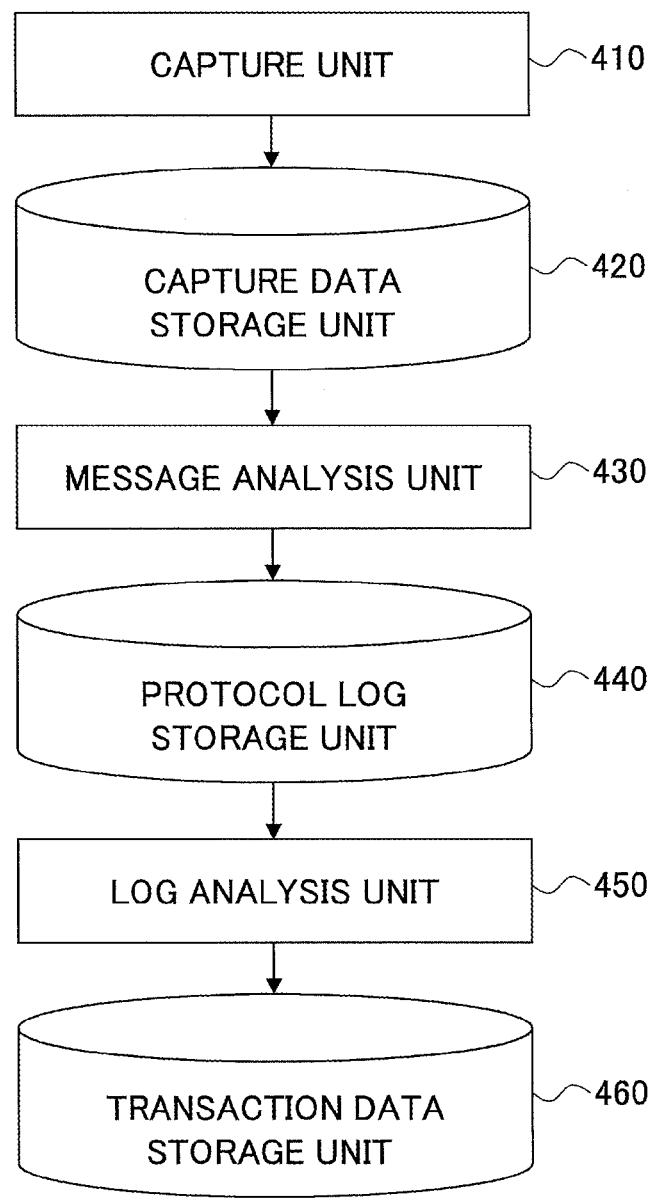
FIG. 4 illustrates an example of a configuration of a system visualization apparatus 400.

FIG. 4 illustrates an example of a configuration of the system visualization apparatus 400. The system visualization apparatus 400 includes a capture unit 410, a capture data storage unit 420, a message analysis unit 430, a protocol log storage unit 440, a log analysis unit 450, and a transaction data storage unit 460.

The capture unit 410 receives a packet from the physical switch 310, and stores it in the capture data storage unit 420. The message analysis unit 430 extracts predetermined data from the packets stored in the capture data storage unit 420, and stores it in the protocol log storage unit 440. The log analysis unit 450 executes an analysis process of a log using the data stored in the protocol log storage unit 440, and stores it in the transaction data storage unit 460. The configuration of the system visualization apparatus 400 is just an example, and another configuration may be adopted.

(Content of Process by Mirror Unit 114 or 214)

In the following, content of a process will be more concretely described that is executed by the mirror unit 114 or 214 when collecting packets transmitted/received between VMs on the same physical server. Note that the same process is executed by the mirror unit 114 and the mirror unit 214, and it will be described for the mirror unit 114 only.

Figure 5:
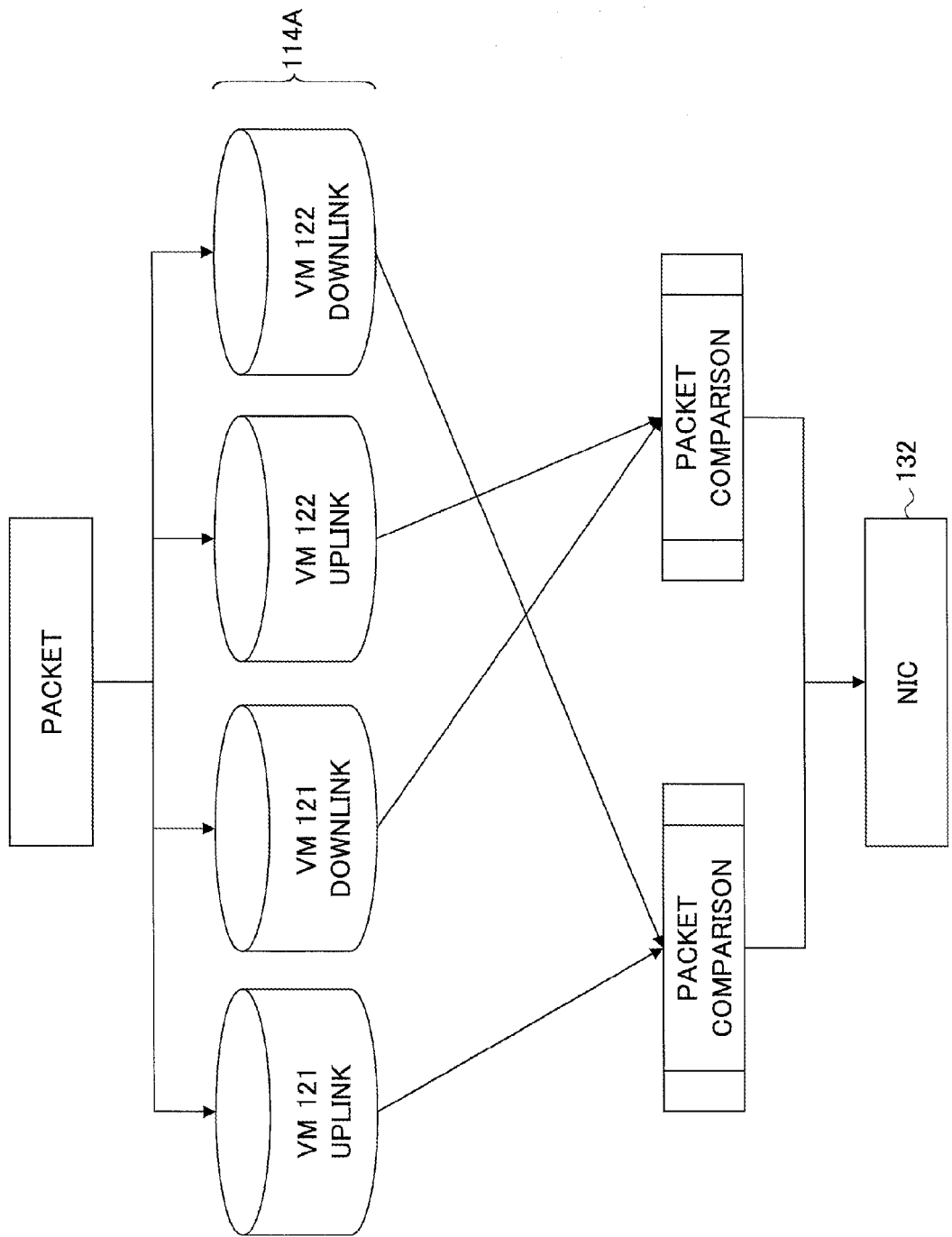
FIG. 5 is a schematic view conceptually illustrating an overview of a process executed by a mirror unit 114.

FIG. 5 is a schematic view conceptually illustrating an overview of the process executed by the mirror unit 114. As illustrated in the upper part of FIG. 5, the mirror unit 114 captures packets transmitted/received by all VMs in the physical server 100 (namely, packets that pass through the VIFs 111 and 112), and stores them in corresponding areas in the packet buffer 114A provided for each VM and each uplink/downlink distinction. Specifically, the mirror unit 114 divides packets into uplink packets transmitted to the VM 121; downlink packets transmitted from the VM 121 to the other VM; uplink packets transmitted to the VM 122; and downlink packets transmitted from the VM 122 to the other VM, and stores them in the respective corresponding areas. In the following, uplink packets transmitted to the VM 121 are referred to as "VM 121 uplink packets", and downlink packets transmitted from the VM 121 are referred to as "VM 121 downlink packets". Also, uplink packets transmitted to the VM 122 are referred to as "VM 122 uplink packets", and downlink packets transmitted from the VM 122 are referred to as "VM 122 downlink packets".

Note that an upward arrow attached to a packet that passes through the VIF 111 or 112 in FIG. 1 designates an uplink packet, and a downward arrow designates a downlink packet.

Defining more strictly, an uplink packet in the present embodiment may be defined as a packet that is transferred in a direction approaching a VM corresponding to the VIF at the position where the packet is captured (the VIF receives/transmits the packet).

On the other hand, a downlink packet may be defined as a packet that is transferred in a direction moving away from the VM corresponding to a VIF at the position where the packet is captured.

Note that multiple VMs may exist that correspond to a position where the packet is captured (an example is found in the second embodiment where a packet is captured at the NIC 130). In this case, the wording of "the corresponding VM" may be changed to "one of the corresponding VMs". For example, VMs corresponding to the NIC 130 are all VMs (121 and 122) on the physical server 100, and VMs corresponding to the NIC 230 are all VMs (221 and 222) on the physical server 200.

Figure 6:
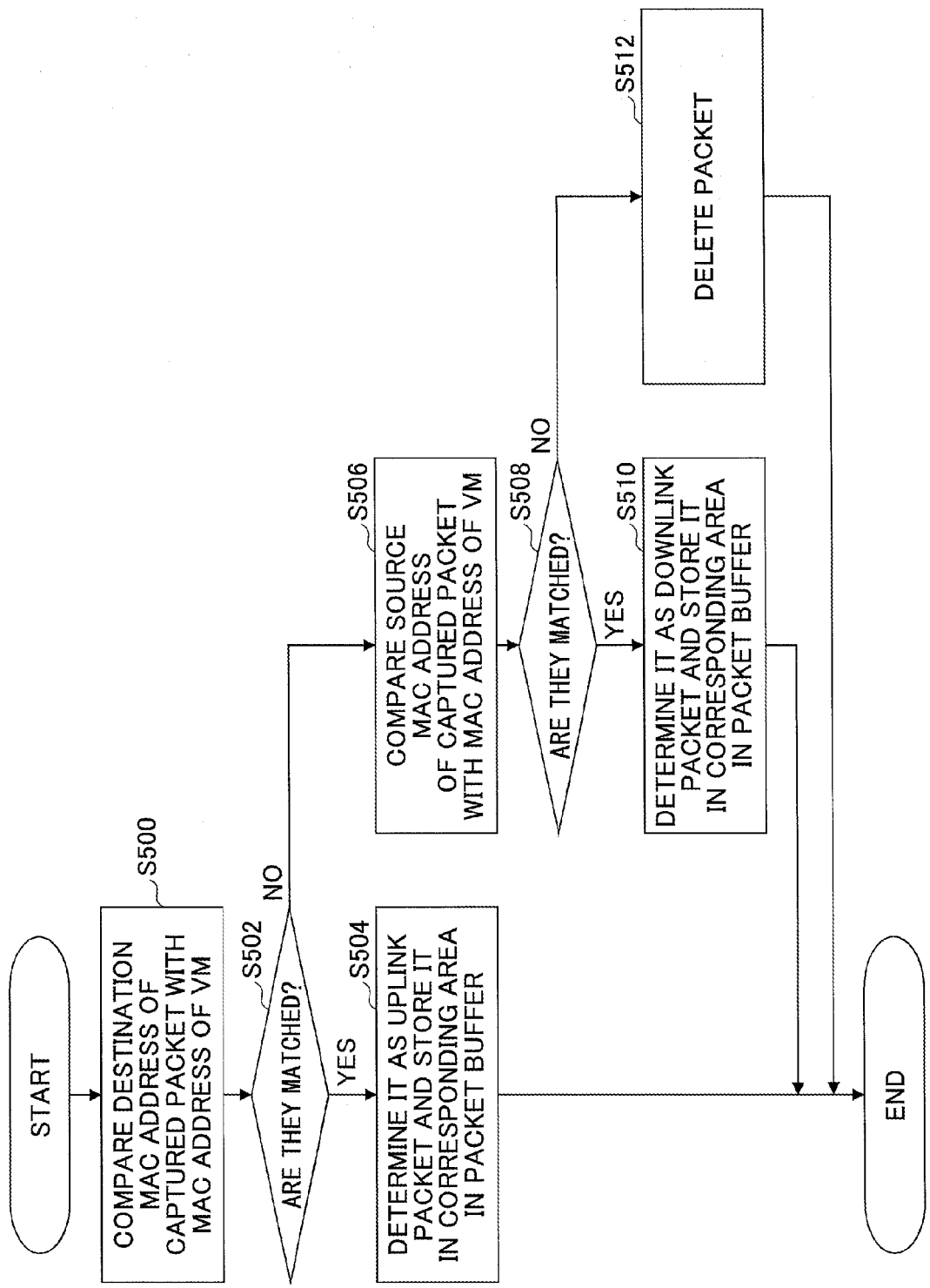
FIG. 6 is a flowchart of a process executed by the mirror unit 114 for determining whether a packet is an uplink packet or a downlink packet.

FIG. 6 is a flowchart of a process executed by the mirror unit 114 for determining whether a packet is an uplink packet or a downlink packet. This flowchart is executed every time a packet is captured.

First, the mirror unit 114 compares the destination MAC address in the MAC header of a captured packet, with the MAC address of the VM corresponding to the VIF at the position where the packet is captured (Step S500). Then, the mirror unit 114 determines whether the destination MAC address and the MAC address of the VM are matched (Step S502).

If the destination MAC address and the MAC address of the VM are matched, the mirror unit 114 determines that the packet is an uplink packet, and stores the packet in the corresponding area in the packet buffer 114A (Step S504).

If the destination MAC address and the MAC address of the VM are not matched, the mirror unit 114 compares the source MAC address in the MAC header of the packet, with the MAC address of the VM corresponding to the VIF at the position where the packet is captured (Step S506). Then, the mirror unit 114 determines whether the source MAC address and the MAC address of the VM are matched (Step S508).

If the source MAC address and the MAC address of the VM are matched, the mirror unit 114 determines that the packet is a downlink packet, and stores the packet in the corresponding area in the packet buffer 114A (Step S510).

If the source MAC address and the MAC address of the VM are not matched, the mirror unit 114 determines that it is error data, and deletes the packet (Step S512).

Note that the packet stored at Step S504 or S510 is set to have the captured time attached.

The process executed by the mirror unit 114 for determining whether it is an uplink packet or a downlink packet may be executed using the destination address and the source address included in the IP header of a packet. In this case, the mirror unit 114 holds table data in which IP addresses of the VMs correspond with the respective VIFs.

Figure 7:
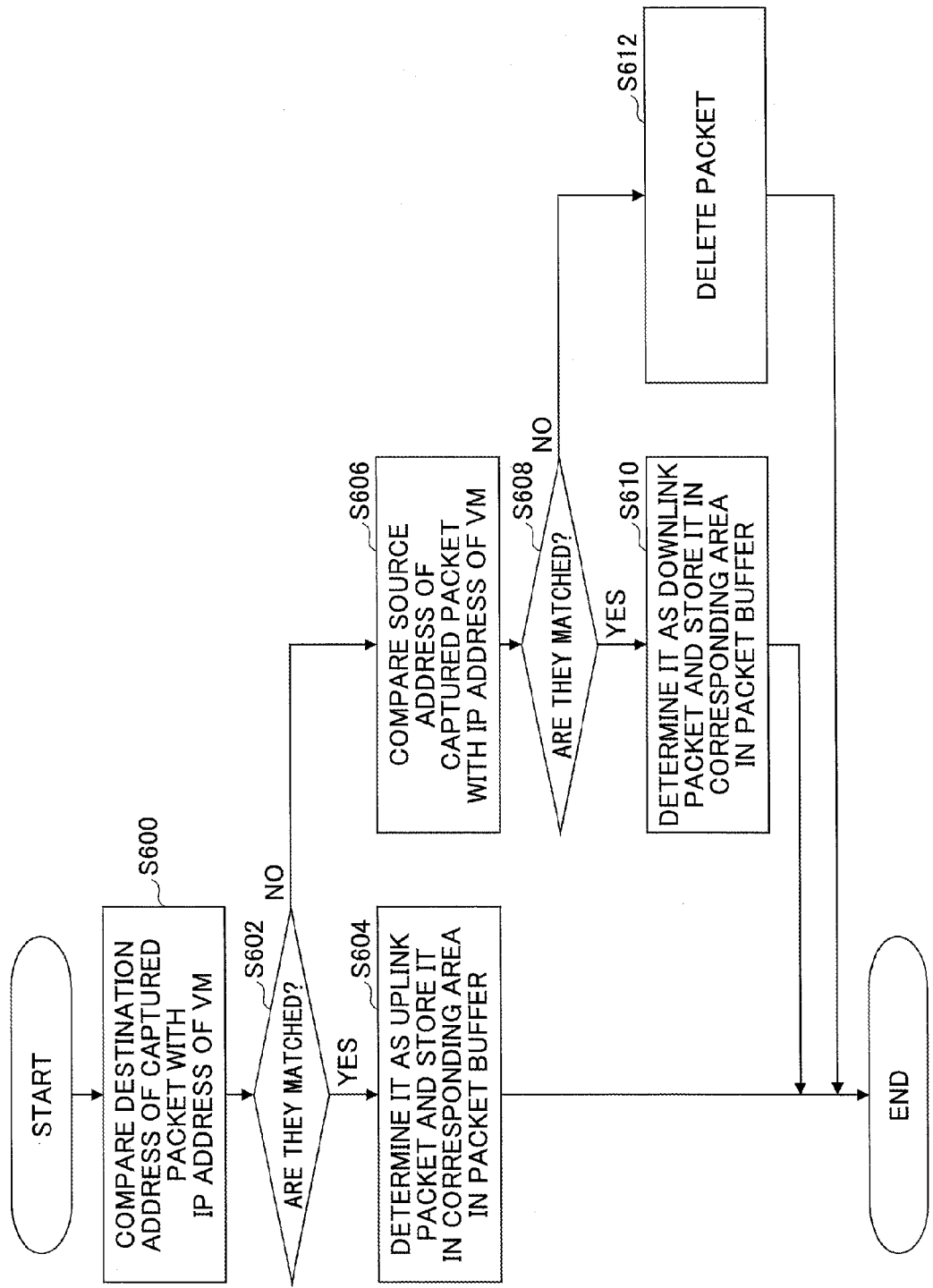
FIG. 7 is another example of a flowchart of a process executed by the mirror unit 114 for determining whether a packet is an uplink packet or a downlink packet.

FIG. 7 is another example of a flowchart of a process executed by the mirror unit 114 for determining whether a packet is an uplink packet or a downlink packet. This flowchart is executed every time a packet is captured.

First, the mirror unit 114 compares the destination address in the IP header of a captured packet, with the IP address of the VM corresponding to the VIF at the position where the packet is captured (Step S600). Then, the mirror unit 114 determines whether the destination address and the IP address of the VM are matched (Step S602).

If the destination address and the IP address of the VM are matched, the mirror unit 114 determines that the packet is an uplink packet, and stores the packet in the corresponding area in the packet buffer 114A (Step S604).

If the destination address and the IP address of the VM are not matched, the mirror unit 114 compares the source address in the IP header of the packet, with the IP address of the VM corresponding to the VIF at the position where the packet is captured (Step S606). Then, the mirror unit 114 determines whether the source address and the IP address of the VM are matched (Step S608).

If the source address and the IP address of the VM are matched, the mirror unit 114 determines that the packet is a downlink packet, and stores the packet in the corresponding area in the packet buffer 114A (Step S610).

If the source address and the IP address of the VM are not matched, the mirror unit 114 determines that it is error data, and deletes the packet (Step S612).

Note that the packet stored at Step S604 or S610 is set to have the captured time attached.

After having stored the packet in the corresponding area in the packet buffer 114A by the process illustrated in FIG. 6 or 7, the mirror unit 114 compares packets with each other to determine whether they are matched, and extracts packets that are transmitted/received between VMs on the same physical server 100 as illustrated in the lower part in FIG. 5. Packet comparisons are executed for combinations of VM 121 uplink packets and VM 122 downlink packets, and combinations of VM 121 downlink packets and VM 122 uplink packets.

Figure 8:
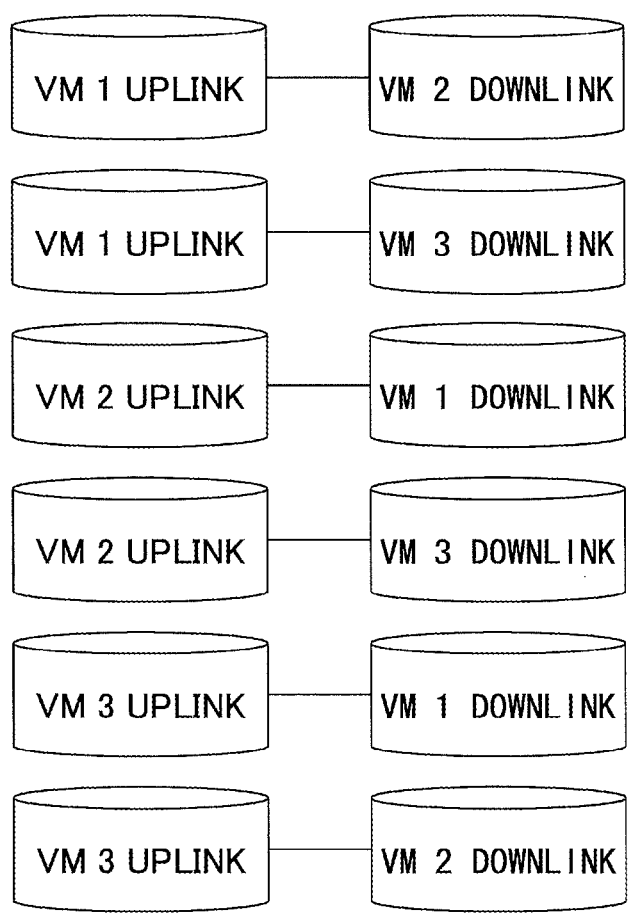
FIG. 8 is a schematic view illustrating combinations of packet comparisons when the number of VMs is three.

Note that if there are more than two VMs on the physical server 100, the mirror unit 114 compares uplink packets of a VM with downlink packets of all the other VMs, and compares uplink packets of the VM with downlink packets of all the other VMs, and repeats these comparisons for all VMs. FIG. 8 is a schematic view illustrating combinations of packet comparisons when the number of VMs is three. Also, FIG. 9 is a schematic view illustrating combinations of packet comparisons when the number of VMs is four. In FIGS. 8-9, VMs are denoted as VM 1, VM 2, and so on. As can be seen, the mirror unit 114 executes packet comparisons n·(n−1) times where n is the number of VMs.

Figure 10:
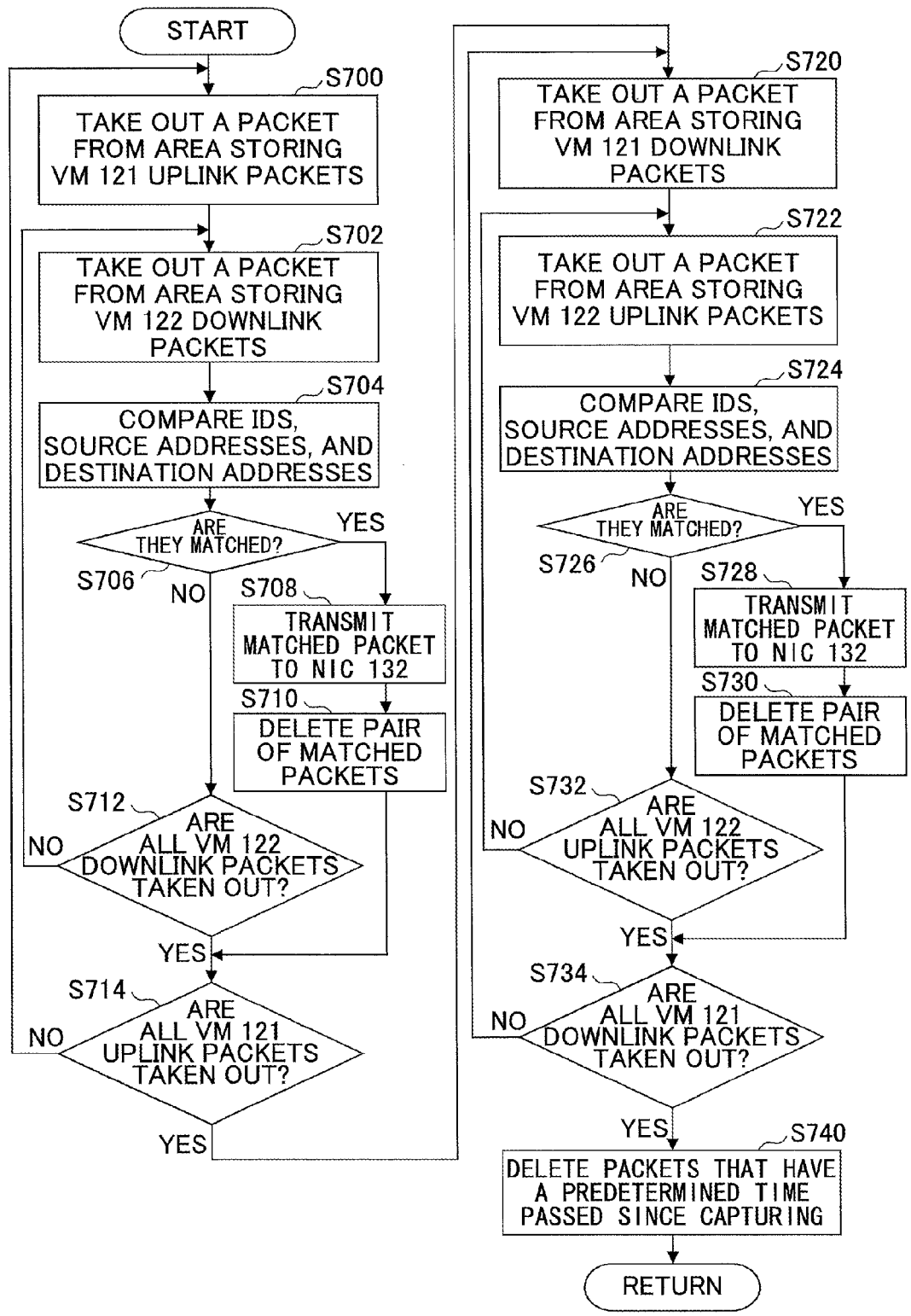
FIG. 10 is a flowchart of a process executed by the mirror unit 114 for packet comparison.

FIG. 10 is a flowchart of a process executed by the mirror unit 114 for packet comparison. This flowchart is repeatedly executed, for example, at predetermined intervals.

First, the mirror unit 114 takes out a packet from the area where "VM 121 uplink packets" are stored in the packet buffer 114A (Step S700), and then, takes out a packet from the area where "VM 122 downlink packets" are stored (Step S702). The order of taking out packets may be determined based on, for example, FIFO (First In, First Out) basis.

Next, the mirror unit 114 compares the IDs, source addresses, and destination addresses of IP packets in the IP headers of the packets taken out at Steps S700 and S702, with which IP packets of the taken-out packets can be identified (Step S704). Then, the mirror unit 114 determines whether all of the IDs, source addresses, and destination addresses of the IP headers are matched (Step S706).

If all of the IDs, source addresses, and destination addresses of the IP headers are matched, the mirror unit 114 transmits one of the matched pair of packets (for example, a downlink packet) to the NIC 132 (Step S708). Then, the mirror unit 114 deletes the matched pair of packets in the packet buffer 114A (Step S710). After Step S710, the mirror unit 114 proceeds to Step S714, which will be described later.

If any of the IDs, source addresses, or destination addresses of the IP headers are not matched, the mirror unit 114 determines whether all packets are taken out that are stored in the area for "VM 122 downlink packets" in a loop for "VM 122 downlink packets" (Step S712). The loop for "VM 122 downlink packets" is the loop where Steps S702-S710 are repeatedly executed. If not having taken out all of "VM 122 downlink packets" in the loop, the mirror unit 114 goes back to Step S702, takes out a next packet from "VM 122 downlink packets", and executes Steps S704 and after.

If having taken out all of "VM 122 downlink packets" or after having executed Step S710, the mirror unit 114 determines whether all packets are taken out that are stored in the area for "VM 121 uplink packets" in a loop for "VM 121 uplink packets" (Step S714). The loop for "VM 121 uplink packets" is the loop where Steps S700-S712 are repeatedly executed. If not having taken out all of "VM 121 uplink packets" in the loop, the mirror unit 114 goes back to Step S700, takes out a next packet from "VM 121 uplink packets", and executes Steps S702 and after.

If having taken out all of "VM 121 uplink packets", the mirror unit 114 takes out a packet from the area where "VM 121 downlink packets" are stored in the packet buffer 114A (Step S720). Further, the mirror unit 114 takes out a packet from the area where "VM 122 uplink packets" are stored (Step S722).

Next, the mirror unit 114 compares the IDs, source addresses, and destination addresses of IP packets in the IP headers of the packets taken out Steps S720 and S722, with which IP packets of the taken-out packets can be identified (Step S724). Then, the mirror unit 114 determines whether all of the IDs, source addresses, and destination addresses of the IP headers are matched (Step S726).

If all of the IDs, source addresses, and destination addresses of the IP headers are matched, the mirror unit 114 transmits one of the matched pair of packets (for example, a downlink packet) to the NIC 132 (Step S728). Then, the mirror unit 114 deletes the matched pair of packets in the packet buffer 114A (Step S730).

If any of the IDs, source addresses, or destination addresses of the IP headers is not matched, the mirror unit 114 determines whether all packets are taken out that are stored in the area for "VM 122 uplink packets" in a loop for "VM 122 uplink packets" (Step S732). The loop for "VM 122 uplink packets" is the loop where Steps S722-S730 are repeatedly executed. If not having taken out all of "VM 122 uplink packets" in the loop, the mirror unit 114 goes back to Step S722, takes out a next packet from "VM 122 uplink packets", and executes Steps S724 and after.

If having taken out all of "VM 122 uplink packets", the mirror unit 114 determines whether all packets are taken out that are stored in the area for "VM 121 downlink packets" in a loop for "VM 121 downlink packets" (Step S734). The loop for "VM 121 downlink packets" is the loop where Steps S720-S732 are repeatedly executed. If not having taken out all of "VM 121 downlink packets" in the loop, the mirror unit 114 goes back to Step S720, takes out a next packet from "VM 121 downlink packets", and executes Steps S722 and after.

If having taken out all of "VM 121 downlink packets", the mirror unit 114 deletes packets that have a predetermined time passed since they have been captured among all packets in the packet buffer 114A (Step S740).

Note that, the flowchart illustrated in FIG. 10 is for a case where the number of VMs existing on the physical server 100 is two. If the number of VMs existing on the physical server 100 is greater than two, the loops of Steps S700 to S714 and Steps S720-S734 may be executed n·(n−1) times.

(Modified Example)

Figure 11:
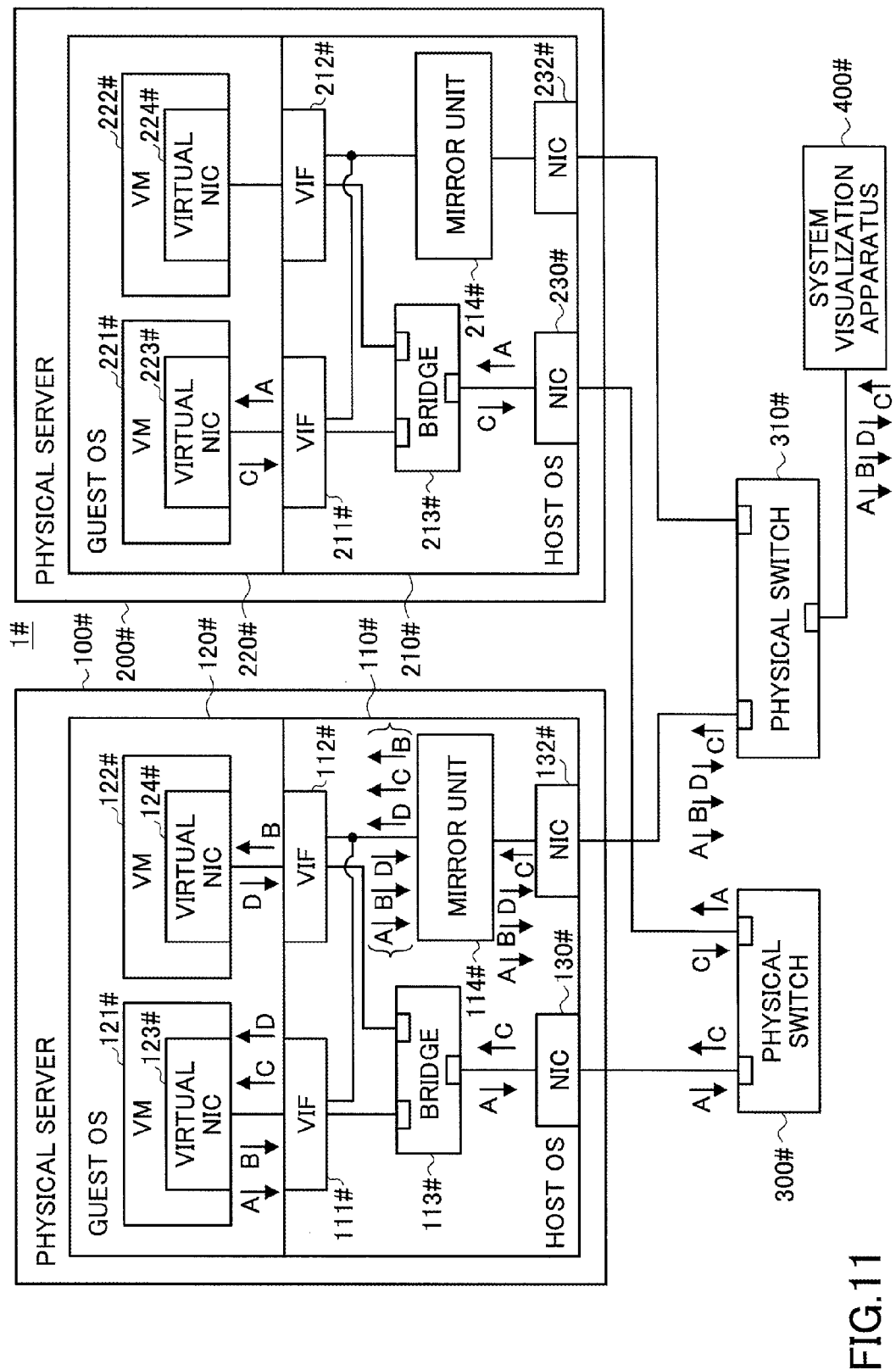
FIG. 11 is a schematic view illustrating a modified example of an information processing system 1# and physical servers 100# and 200#.

Here, a modified example of an information processing system and a physical server will be described. FIG. 11 is a schematic view illustrating a modified example of an information processing system 1# and physical servers 100# and 200#. In FIG. 11, elements that correspond to those in the information processing system 1 and the physical servers 100 and 200 in the first embodiment have the suffix of # in their numerical codes.

A mirror unit 114# included in the physical server 100# in the modified example collects all packets that pass through VIFs 111# and 112#, and transmits them to a NIC 132#. With this configuration, data received/transmitted between multiple virtual machines on the same physical server can be output to an external device. As a result, the external device, namely, a system visualization apparatus, can collect both data received/transmitted between multiple virtual machines on the same physical server, and data received/transmitted between the physical server and the external device.

The information processing system and the physical servers in the first embodiment illustrated in FIG. 1 can reduce the load of packet transfer in the NIC 132 compared to the information processing system and the physical servers in the modified example. This is because the NIC 132# transfers "A↓B↓D↓C↑" in the physical server 100# in the modified example, whereas the NIC 132 transfers "B↓D↓" in the physical server 100 in the present embodiment.

The information processing system and the physical servers in the first embodiment collect packets transmitted/received between VMs on the same physical server to transmit them to the NIC 132, but delegates mirroring of packets transmitted/received between different physical servers to the physical switch 300. Therefore, the load of packet transfer in the NIC 132 is not excessively high, which makes it possible to implement smooth information reception/transmission. Also, the physical servers do not need to be equipped with excessively highly-functional NICs 132 so that an increase of the cost and weight can be suppressed. The mirror unit 214 and the NIC 232 have the same relationship.

(Overview)

Data received/transmitted between multiple virtual machines on the same the information processing apparatus (physical server) can be output to an external device by using the physical server, the communication data output method and program, and the information processing system according to the present embodiment. As a result, the external device, namely, a system visualization apparatus, can collect both data received/transmitted between multiple virtual machines on the same physical server, and data received/transmitted between the physical server and the external device.

Second Embodiment

In the following, an information processing apparatus, a communication data output method, a communication data output program, and an information processing system will be described according to a second embodiment with reference to the drawings.

Figure 12:
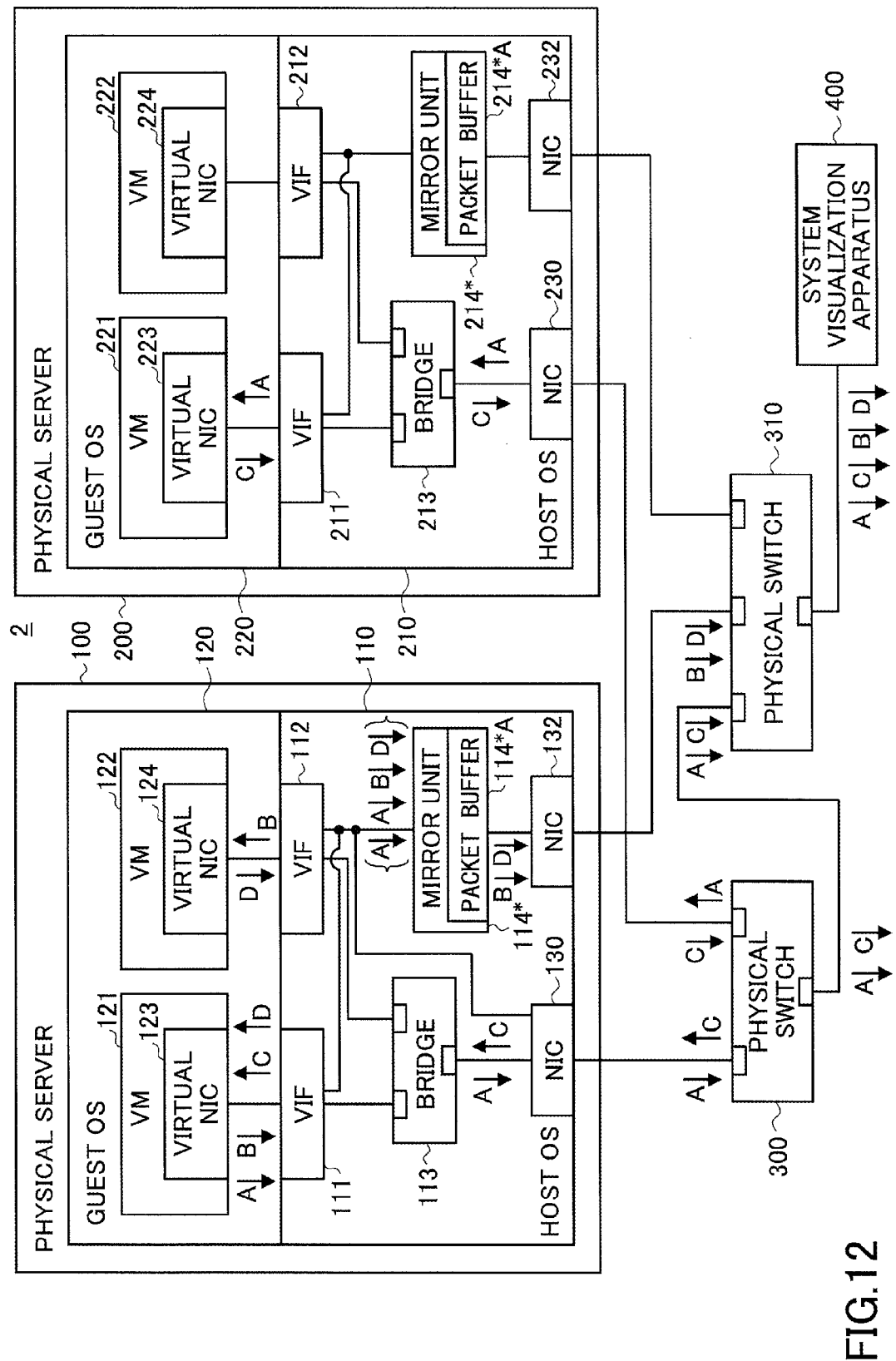
FIG. 12 illustrates an example of a system configuration of an information processing system 2 according to a second embodiment of the present invention.

FIG. 12 illustrates an example of a system configuration of an information processing system 2 according to the second embodiment of the present invention. The information processing system 2 according to the second embodiment differs from that in the first embodiment in content of processing executed by the mirror unit. Therefore, the mirror unit is denoted as a mirror unit 114* or 214*, the packet buffer is denoted as a packet buffer 114*A or 214*A, and the other elements are assigned the same numeral codes as in the first embodiment.

(Content of Process by Mirror Unit 114*, 214*)

In the following, content of a process executed by the mirror unit 114* or 214* will be concretely described, which is executed for collecting packets transmitted/received between VMs on the same physical server. Note that the mirror unit 114* and the mirror unit 214* execute the same process; hence, it will be described only for the mirror unit 114*.

Figure 13:
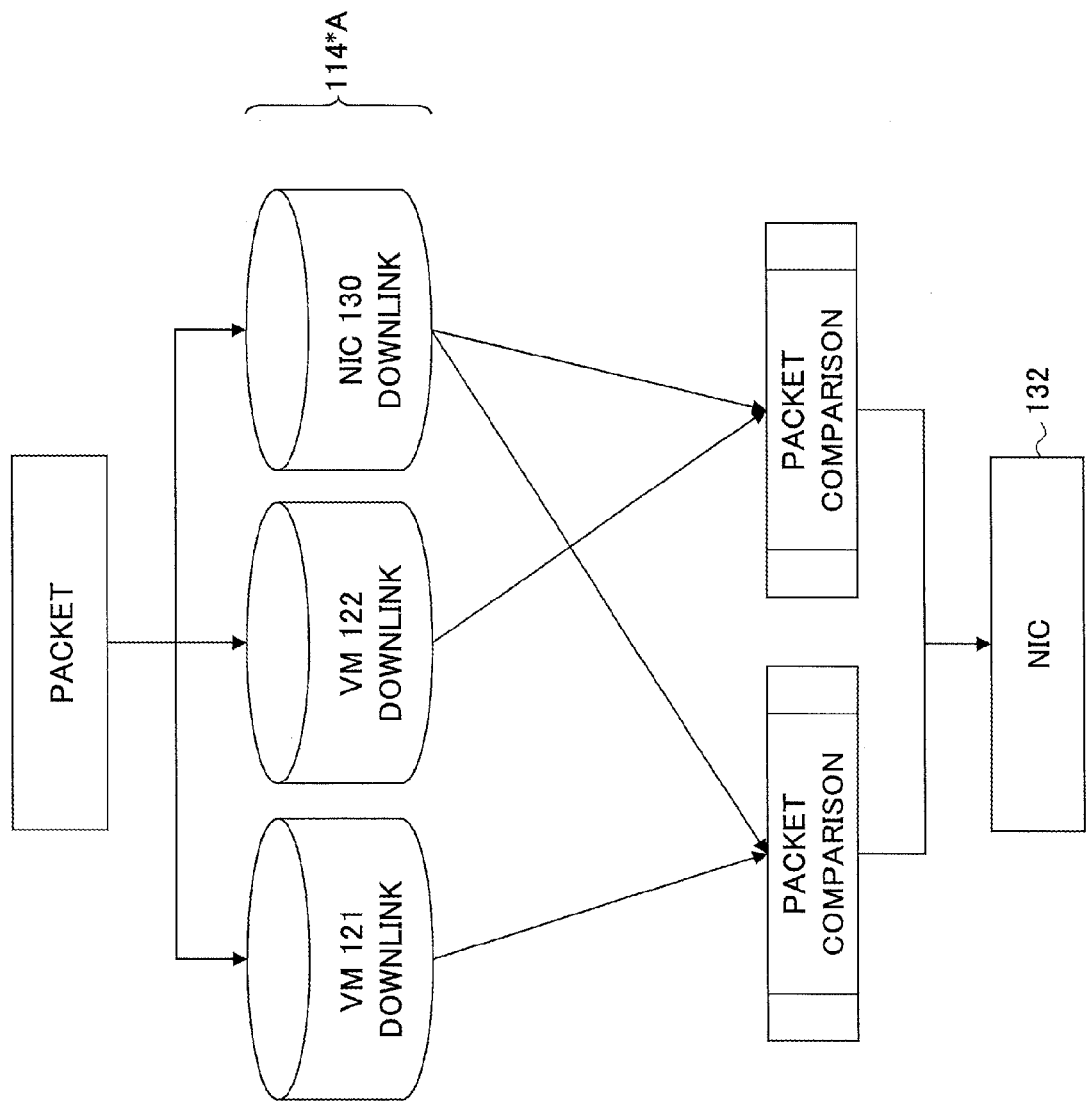
FIG. 13 is a schematic view conceptually illustrating an overview of a process executed by a mirror unit 114*.

FIG. 13 is a schematic view conceptually illustrating an overview of the process executed by the mirror unit 114*. As illustrated in the upper part of FIG. 13, the mirror unit 114* captures packets transmitted/received by all VMs in the physical server 100 and packets that pass through the NIC 130, and stores them in corresponding areas in the packet buffer 114*A. Specifically, the mirror unit 114* divides packets into downlink packets transmitted from the VM 121 to the other VM; downlink packets transmitted from the VM 122 to the other VM; and downlink packets transmitted from the NIC 130 to the physical switch 300, and stores them in the respective corresponding areas in the packet buffer 114*A. In the following, downlink packets transmitted from the VM 121 to the other VM are referred to as "VM 121 downlink packets", and downlink packets transmitted from the VM 122 to the other VM are referred to as "VM 122 downlink packets". Also, the downlink packets transmitted from the NIC 130 to the physical switch 300 are referred to as "NIC 130 downlink packets".

In the present embodiment, "uplink packets" captured at the NIC 130 are packets received by the NIC 130 from an external device (the physical switch 300), and "downlink packets" are packets transmitted by NIC 130 to the external device (the physical switch 300).

Figure 14:
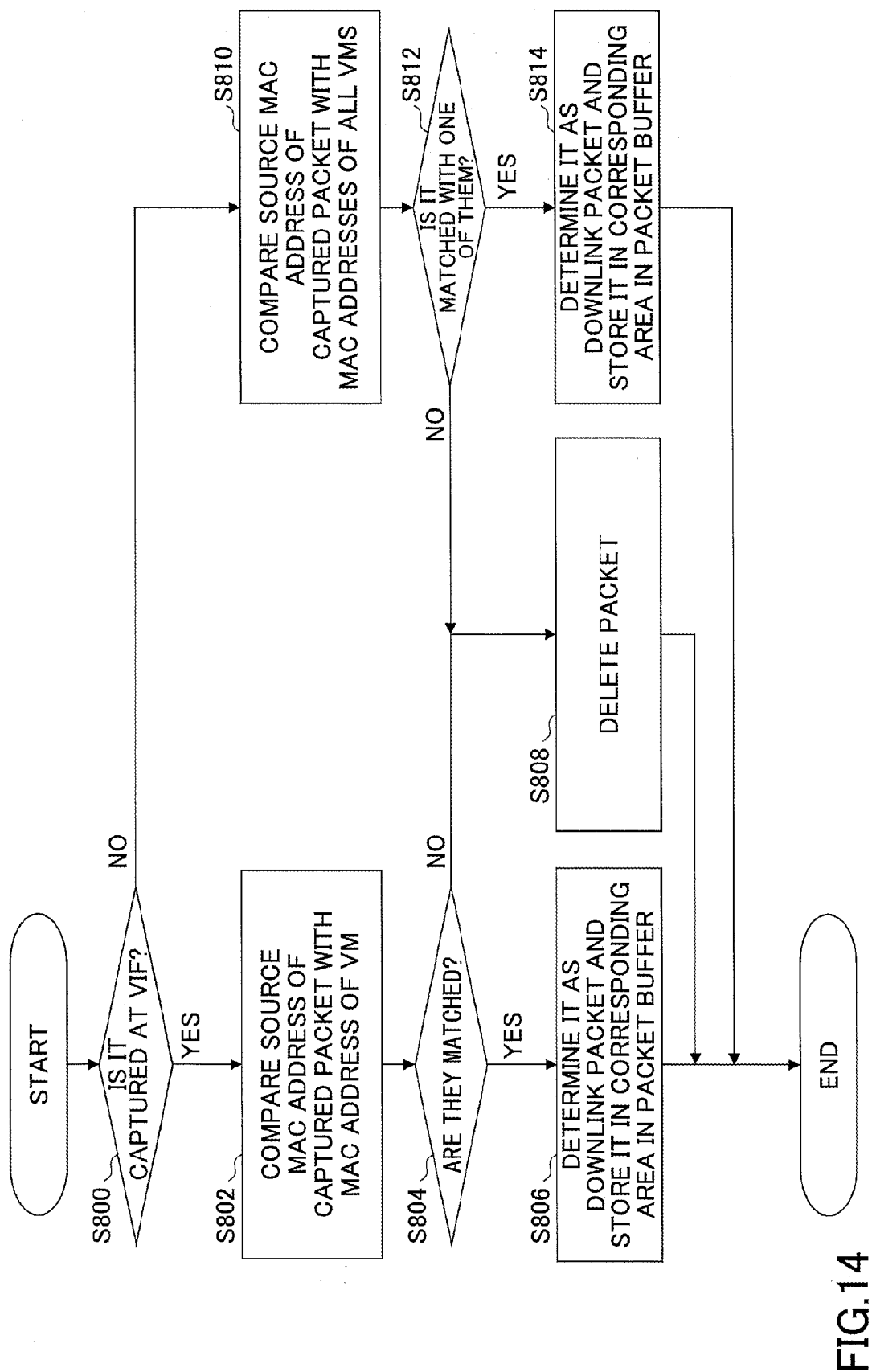
FIG. 14 is a flowchart of a process executed by the mirror unit 114* for selectively collecting downlink packets.

As described above, the mirror unit 114* selectively collects downlink packets. FIG. 14 is a flowchart of a process executed by the mirror unit 114* for selectively collecting downlink packets. This flowchart is executed every time a packet is captured by the mirror unit 114*.

First, the mirror unit 114* determines whether it is a packet captured at the VIF 111 or the VIF 112 (Step S800).

If it is a packet captured at the VIF 111 or the VIF 112, the mirror unit 114* executes the following steps. The mirror unit 114* compares the source MAC address in the MAC header of the captured packet, with the MAC address of the VM corresponding to the VIF at the position where the packet is captured (Step S802). Then, the mirror unit 114* determines whether the source MAC address and the MAC address of the VM are matched (Step S804).

If the source MAC address and the MAC address of the VM are matched, the mirror unit 114* determines that the packet is a downlink packet, and stores the packet in the corresponding area in the packet buffer 114*A (Step S806).

If the source MAC address and the MAC address of the VM are not matched, the mirror unit 114* determines that the packet is an uplink packet or error data, and deletes the packet (Step S808).

On the other hand, if it is determined at Step S800 that it is not a packet captured at the VIF 111 or the VIF 112, namely, it is a packet captured at the NIC 130, the mirror unit 114* executes the following steps.

First, the mirror unit 114* compares the source MAC address with the MAC address of every VM (121 or 122) on the physical server 100 (Step S810). Then, the mirror unit 114* determines whether the source MAC address and one of the MAC addresses of the VMs are matched (Step S812).

If the source MAC address and one of the MAC addresses of the VMs are matched, the mirror unit 114* determines that the packet is a downlink packet, and stores the packet in the corresponding area in the packet buffer 114*A (Step S814).

If the source MAC address and any one of the MAC addresses of the VMs are not matched, the mirror unit 114* determines that the packet is an uplink packet or error data, and deletes the packet (Step S808).

Note that the packet stored at Step S806 or S814 is set to have the captured time attached.

Figure 15:
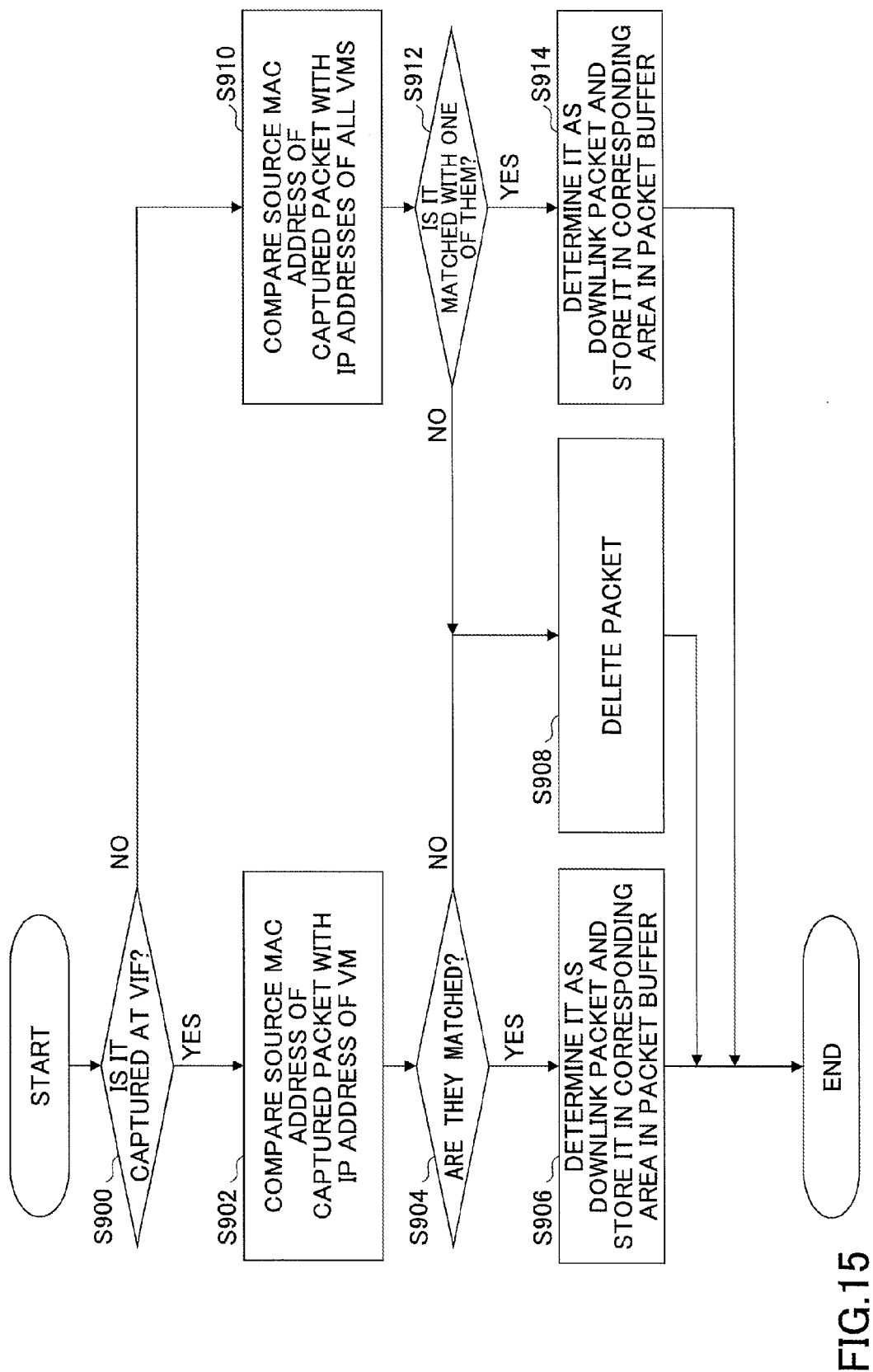
FIG. 15 is another example of a flowchart of a process executed by the mirror unit 114* for selectively collecting downlink packets.

FIG. 15 is another example of a flowchart of a process executed by the mirror unit 114* for selectively collecting downlink packets. This flowchart is executed every time a packet is captured by the mirror unit 114*.

First, the mirror unit 114* determines whether it is a packet captured at the VIF 111 or the VIF 112 (Step S900).

If it is a packet captured at the VIF 111 or the VIF 112, the mirror unit 114* executes the following steps. The mirror unit 114* compares the source MAC address in the MAC header of the captured packet, with the IP address of the VM corresponding to the VIF at the position where the packet is captured (Step S902). Then, the mirror unit 114* determines whether the source MAC address and the IP address of the VM are matched (Step S904).

If the source address and the IP address of the VM are matched, the mirror unit 114* determines that the packet is a downlink packet, and stores the packet in the corresponding area in the packet buffer 114*A (Step S906).

If the source address and the IP address of the VM are not matched, the mirror unit 114* determines that the packet is an uplink packet or error data, and deletes the packet (Step S908).

On the other hand, if it is determined at Step S900 that it is not a packet captured at the VIF 111 or the VIF 112, namely, it is a packet captured at the NIC 130, the mirror unit 114* executes the following steps. The mirror unit 114* compares the source address with the IP address of every VM (121 or 122) on the physical server 100 (Step S910). Then, the mirror unit 114* determines whether the source address and one of the IP addresses of the VMs are matched (Step S912).

If the source address and one of the IP addresses of the VMs are matched, the mirror unit 114* determines that the packet is a downlink packet, and stores the packet in the corresponding area in the packet buffer 114*A (Step S914).

If the source address and any one of the IP addresses of the VMs are not matched, the mirror unit 114* determines that the packet is an uplink packet or error data, and deletes the packet (Step S908).

Note that the packet stored at Step S906 or S914 is set to have the captured time attached.

After having stored the packet in the corresponding area in the packet buffer 114*A, the mirror unit 114* compares packets with each other to determine whether they are matched, and extracts packets that are transmitted/received between VMs on the same physical server 100 as illustrated in the lower part in FIG. 13. Packet comparisons are executed for combinations of VM 121 downlink packets and NIC 130 downlink packets, and combinations of VM 122 downlink packets and NIC 130 downlink packets, respectively.

Figure 16:
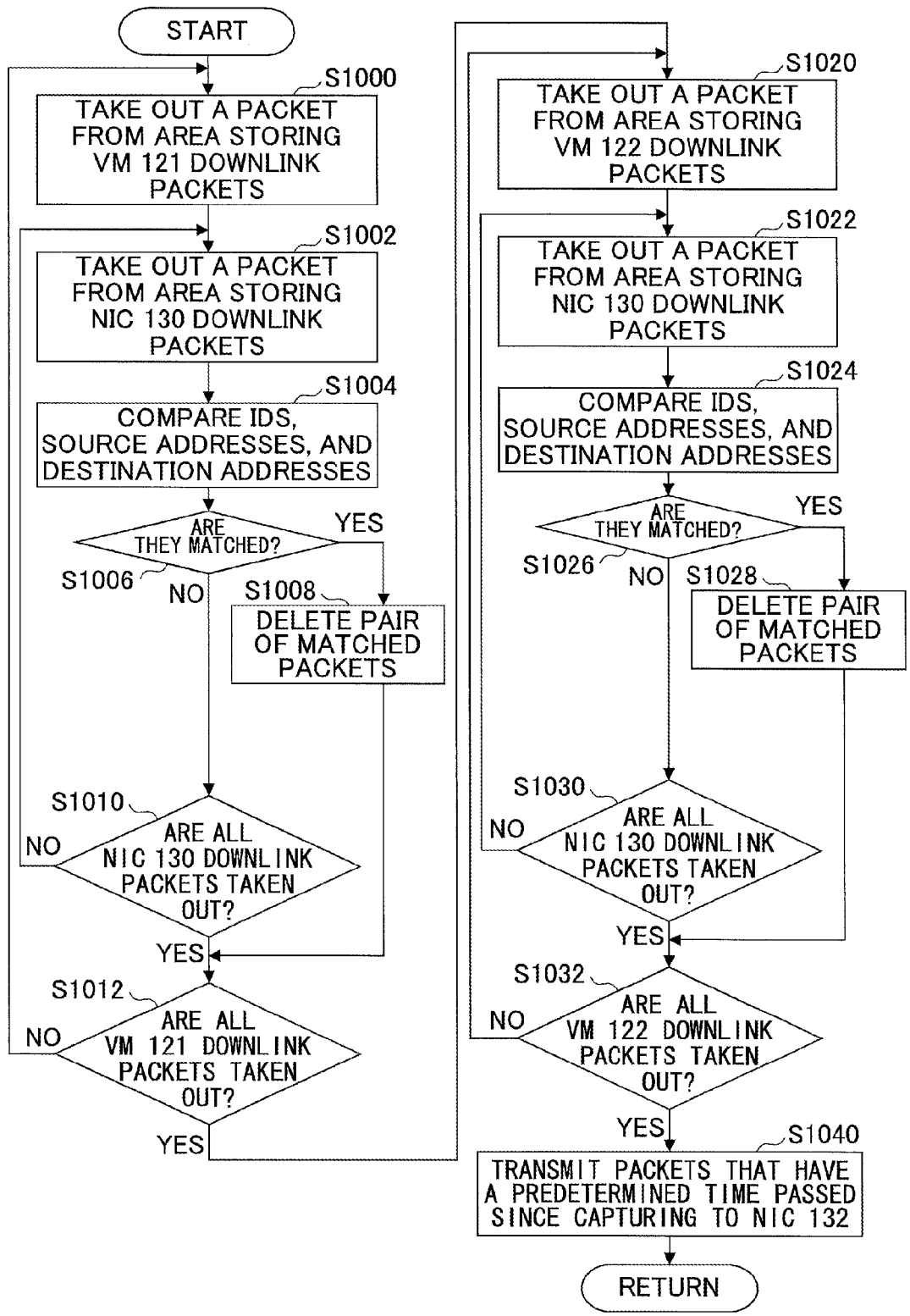
FIG. 16 is a flowchart of a process executed by the mirror unit 114* for packet comparison.

FIG. 16 is a flowchart of a process executed by the mirror unit 114* for packet comparison. The flow for example, predetermined time is repeatedly executed.

First, the mirror unit 114* takes out a packet from the area where "VM 121 downlink packets" are stored in the packet buffer 114*A (Step S1000), and then, takes out a packet from the area where "NIC 130 downlink packets" are stored (Step S1002). The order of taking out packets may be determined based on, for example, FIFO (First In, First Out) basis.

Next, the mirror unit 114* compares the IDs, source addresses, and destination addresses of IP packets in the IP headers of the packets taken out at Steps S1000 and S1002, with which IP packets of the taken-out packets can be identified (Step S1004). Then, the mirror unit 114* determines whether all of the IDs, source addresses, and destination addresses of the IP headers are matched (Step 1006).

If all of the IDs, source addresses, and destination addresses of the IP headers are matched, the mirror unit 114* deletes the matched pair of packets in the packet buffer 114*A (Step 1008). After Step S1008, the mirror unit 114* proceeds to Step S1012, which will be described later.

If any of the IDs, source addresses, or destination addresses of the IP headers are not matched, the mirror unit 114* determines whether all packets are taken out that are stored in the area for "NIC 130 downlink packets" in a loop for "NIC 130 downlink packets" (Step S1010). The loop for "NIC 130 downlink packets" is the loop where Steps S1002-S1008 are repeatedly executed. If not having taken out all of "NIC 130 downlink packets" in the loop, the mirror unit 114* goes back to Step S1002, takes out a next packet from "NIC 130 downlink packets", and executes Steps S1004 and after.

If having taken out all of "NIC 130 downlink packets" or after Step S1008, the mirror unit 114* executes the following steps. The mirror unit 114* determines whether all packets are taken out that are stored in the area for "VM 121 downlink packets" in a loop for "VM 121 downlink packets" (Step S1012). The loop for "VM 121 downlink packets" is the loop where Steps S1000-S1010 are repeatedly executed. If not having taken out all of "VM 121 downlink packets" in the loop, the mirror unit 114* goes back to Step S1000, takes out a next packet from "VM 121 downlink packets", and executes Steps S1002 and after.

If having taken out all of "VM 121 downlink packets", the mirror unit 114* takes out a packet from the area where "VM 122 downlink packets" are stored in the packet buffer 114*A (Step S1020). Next, the mirror unit 114* takes out a packet from the area where "NIC 130 downlink packets" are stored (Step S1022).

Next, the mirror unit 114* compares the IDs, source addresses, and destination addresses of IP packets in the IP headers of the packets taken out Steps 1020 and S1022, with which IP packets of the taken-out packets can be identified (Step S1024). Then, the mirror unit 114* determines whether all of the IDs, source addresses, and destination addresses of the IP headers are matched (Step S1026).

If all of the IDs, source addresses, and destination addresses of the IP headers are matched, the mirror unit 114* deletes the matched pair of packets in the packet buffer 114*A (Step S1028). After Step S1028, the mirror unit 114* proceeds to Step S1032, which will be described later.

If any of the IDs, source addresses, or destination addresses of the IP headers are not matched, the mirror unit 114* determines whether all packets are taken out that are stored in the area for "NIC 130 downlink packets" in a loop for "NIC 130 downlink packets" (Step S1030). The loop for "NIC 130 downlink packets" is the loop where Steps S1022-S1028 are repeatedly executed. If not having taken out all of "NIC 130 downlink packets" in the loop, the mirror unit 114* goes back to Step S1022, takes out a next packet from "NIC 130 downlink packets", and executes Steps S1024 and after.

If having taken out all of "NIC 130 downlink packets" or after Step S1028, the mirror unit 114* executes the following steps. The mirror unit 114* determines whether all packets are taken out that are stored in the area for "VM 122 downlink packets" in a loop for "VM 122 downlink packets" (Step S1032). The loop for "VM 122 downlink packets" is the loop where Steps S1020-S1030 are repeatedly executed. If not having taken out all of "VM 122 downlink packets" in the loop, the mirror unit 114* goes back to Step S1020, takes out a next packet from "VM 122 downlink packets", and executes Steps S1022 and after.

If having taken out all of "VM 122 downlink packets", the mirror unit 114* transmits packets that have a predetermined time passed since they have been captured among all packets in the packet buffer 114*A, to the NIC 132 (Step S1040).

Note that the flowchart illustrated in FIG. 16 is for a case where the number of VMs existing on the physical server 100 is two. If the number of VMs existing on the physical server 100 is greater than two, the loops of Steps S1000-S1012 and Steps S1020-S1032 may be executed $n \cdot (n-1)$ times.

Differences between the present embodiment and the modified example in FIG. 11 will not be described with respect to the information processing system 1# and the physical servers 100# and 200# because they are the same as with the first embodiment.

(Overview)

Data received/transmitted between multiple virtual machines on the same the information processing apparatus (physical server) can be output to an external device by using the physical server, the communication data output method and program, and the information processing system according to the present embodiment. As a result, the external device, namely, a system visualization apparatus, can collect both data received/transmitted between multiple virtual machines on the same physical server, and data received/transmitted between the physical server and the external device.

In addition, compared to the first embodiment, although positions are increased for capturing, the number of areas to store captured packets in the packet buffer 114*A can be decreased (see FIGS. 5 and 13).

Third Embodiment

In the following, an information processing apparatus, a communication data output method, a communication data output program, and an information processing system will be described according to a third embodiment with reference to the drawings.

(Underlines are Omitted Below)

Figure 17:
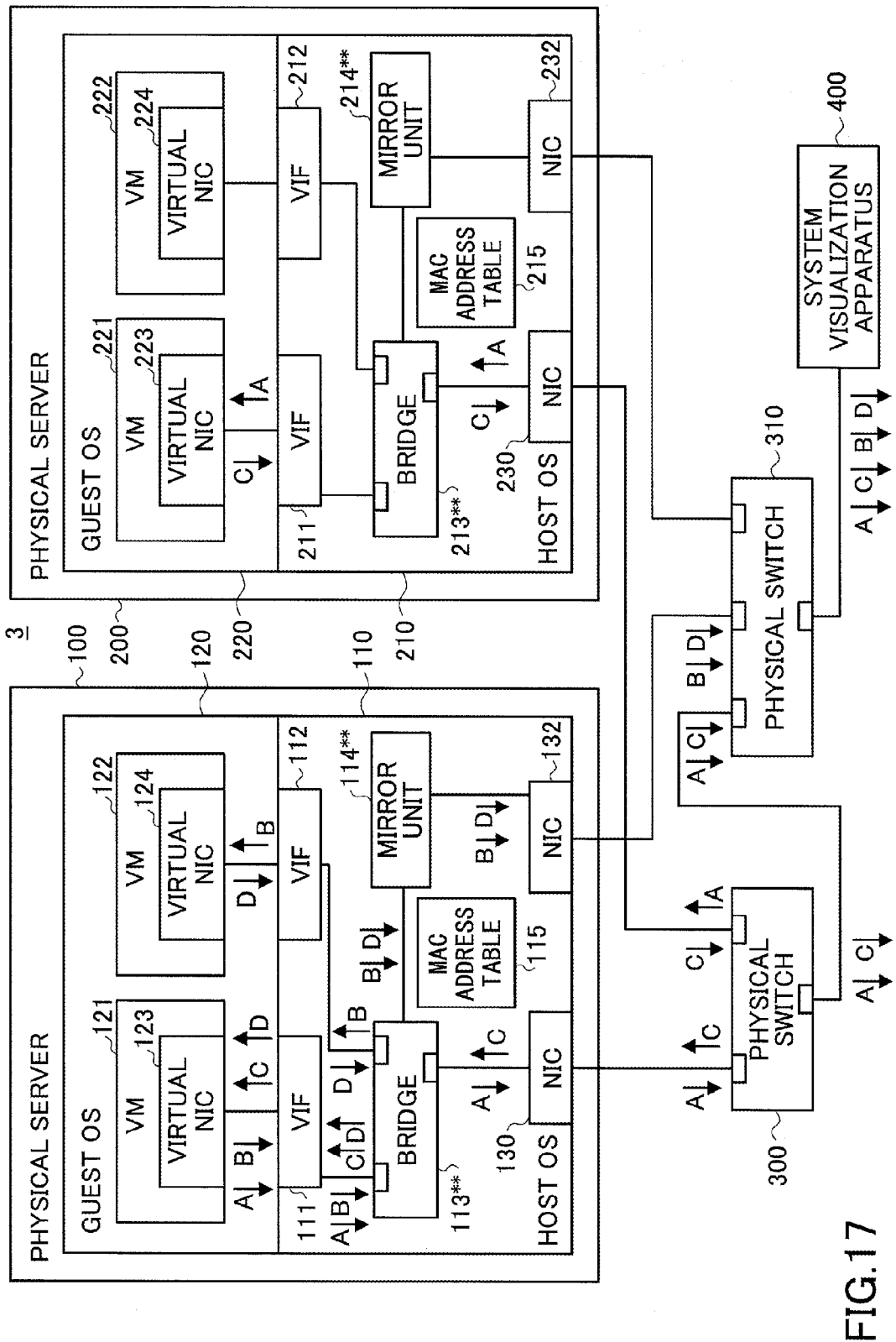
FIG. 17 illustrates an example of a system configuration of an information processing system 3 according to a third embodiment of the present invention.

FIG. 17 illustrates an example of a system configuration of an information processing system 3 according to the third embodiment of the present invention. In the information processing system 3 according to the third embodiment, host OSes 110 and 210 of physical servers 100 and 200 include MAC address tables 115 and 125, respectively. The MAC address table 115 is table data set in the auxiliary storage unit 100D or the memory unit 100E. Similarly, the MAC address table 215 is table data set in the auxiliary storage unit 200D or the memory unit 200E.

The information processing system 3 according to the third embodiment differs from that in the first embodiment in content of processing executed by the bridge and the mirror unit. Therefore, they is denoted as a bridge 113 or 213, and a mirror unit 114 or 214, and the other elements are assigned the same numeral codes as in the first embodiment.

Figure 18:
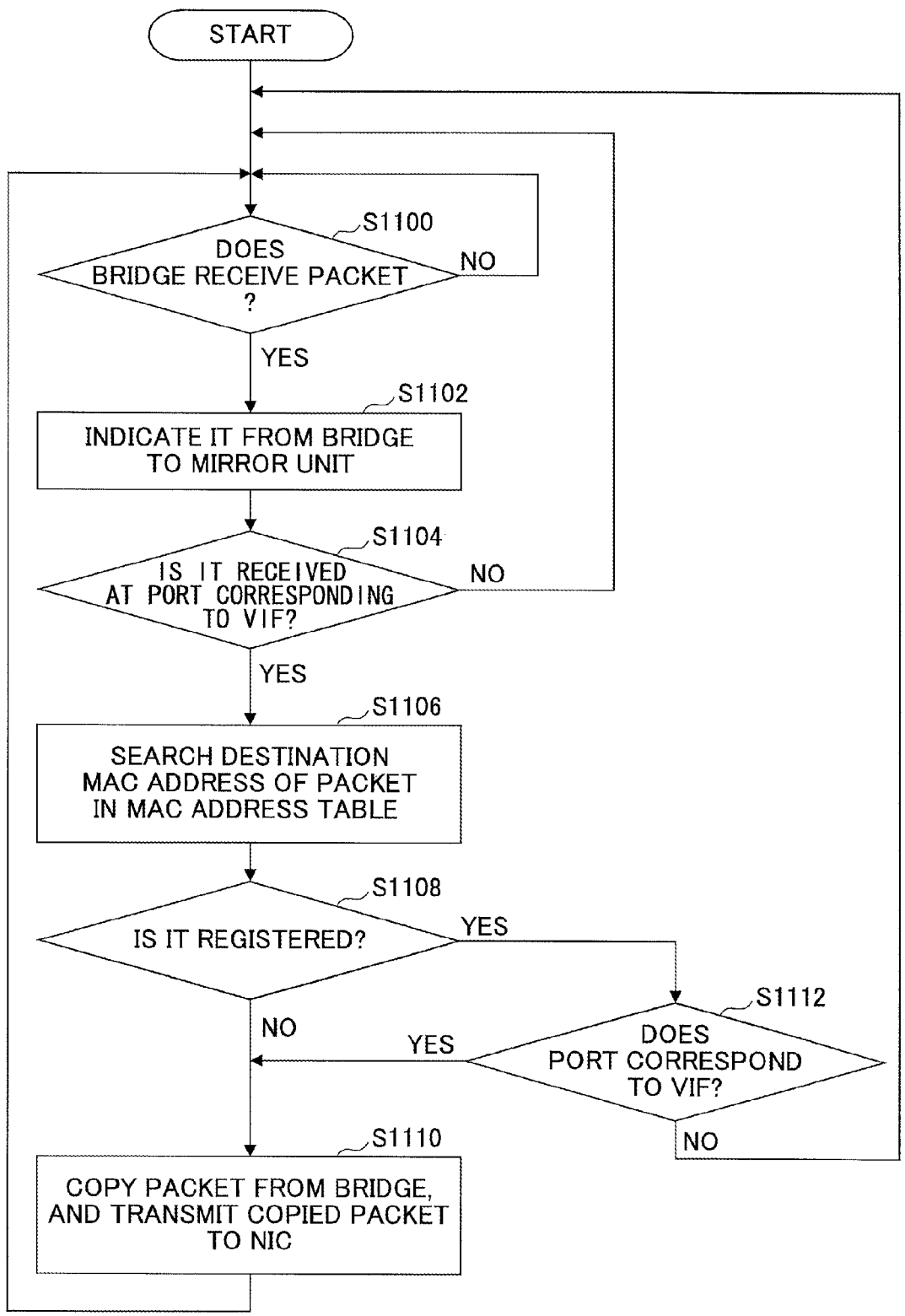
FIG. 18 is a flowchart of a process executed by a bridge 113 and a mirror unit 114, or by a bridge 213 and a mirror unit 214 according to the third embodiment.

FIG. 18 is a flowchart of a process executed by the bridge 113 and the mirror unit 114*, or by the bridge 213 and the mirror unit 214 according to the third embodiment. Although a process will be described with the bridge 113 and the mirror unit 114 in the following, the process is similarly executed with the bridge 213 and the mirror unit 214.

First, the bridge 113 waits for receiving a packet from the VIF 111 or 112, or the NIC 130 (Step S1100). When receiving a packet, the bridge 113 indicates it to the mirror unit 114** (Step S1102).

In response to the indication, the mirror unit 114 determines whether the packet is received at a virtual port of the bridge 113 corresponding to the VIF 111 or 112 (Step S1104).

If the packet is not received at a virtual port of the bridge 113 corresponding to the VIF 111 or 112, the mirror unit 114 goes back to S1100, and waits until the bridge 113** receives a packet.

If the packet is received at a virtual port of the bridge 113 corresponding to the VIF 111 or 112, the mirror unit 114 searches for the destination MAC address of the packet in the MAC address table 115 (Step S1106).

FIG. 19 is a schematic view illustrating an example of data stored as the MAC address table 115. The MAC address table 115 stores MAC addresses learned by the bridge 113** (learned MAC header addresses) associated with respective virtual ports.

The mirror unit 114** determines whether the destination MAC address of the packet is registered in the MAC address table 115 (Step S1108).

If the destination MAC address of the packet is not registered in the MAC address table 115, the mirror unit 114 copies the packet from the bridge 113, and transmits the copied packet to the NIC 132 (Step S1110). Note that the bridge 113** has a function to register the source MAC address of the received packet in the MAC address table 115 to be associated with the virtual port where the packet is received.

If it is registered in the MAC address table 115, the mirror unit 114** determines whether the port corresponding to the destination MAC address in the MAC address table 115 is a port corresponding to the VIF 111 or 112 (Step S1112).

If the port corresponding to the destination MAC address in the MAC address table 115 is not a port corresponding to the VIF 111 or 112, the mirror unit 114 goes back to S1100, and waits until the bridge 113 receives a packet.

On the other hand, if the port is a port corresponding to the VIF 111 or 112, the mirror unit 114 copies the packet from the bridge 113, and transmits the copied packet to the NIC 132 (Step S1110).

As a result of these steps, when the packet B illustrated in FIG. 17 is transmitted from the VM 121 to the VM 122, if the MAC address of the VM 122, which is the destination MAC address of the packet B, is registered in the MAC address table 115, the packet B is transmitted to the NIC 132. If the MAC address of the VM 122 is not registered in the MAC address table 115, the packet B is also transmitted to the NIC 132. In the latter case, the MAC address of the VM 122 is registered in the MAC address table 115, a packet is transmitted to the NIC 132 with a positive determination at Step S1112 in the following process.

On the other hand, a case will be described where the packet A in FIG. 17 is transmitted from the VM 121 to the VM 221. In this case, if the MAC address of the VM 123, which is the destination MAC address of the packet A, is registered in the MAC address table 115, the packet A is not transmitted to the NIC 132 because the port corresponds to the NIC 130. If the MAC address of the VM 123, which is the destination MAC address of the packet A, is not registered in the MAC address table 115, the packet A is transmitted to the NIC 132. In this case, mirroring is also executed at the physical switch 300 for the packet A, and the packet A is transmitted to the system visualization apparatus 400 with duplication; such duplication is within a tolerable range because it is registered in the MAC address table 115 thereafter.

Similarly, when the packet C is transmitted from the VM 221 to the VM 121, the packet C is not transmitted to the NIC 132 because it is received at the port corresponds to the NIC 130 in the bridge 113**.

Differences between the present embodiment and the modified example in FIG. 11 will not be described with respect to the information processing system 1# and the physical servers 100# and 200# because they are the same as with the first embodiment.

(Overview)

Data received/transmitted between multiple virtual machines on the same information processing apparatus (physical server) can be output to an external device by using the physical server, the communication data output method and program, and the information processing system according to the present embodiment. As a result, the external device, namely, a system visualization apparatus, can collect both data received/transmitted between multiple virtual machines on the same physical server, and data received/transmitted between the physical server and the external device.

Note that the information processing apparatus in the third embodiment may collect packets using IP addresses instead of MAC addresses, similarly to the first embodiment.

Described Above are Additional Embodiments

The preferred embodiments of the present invention have been described in detail above. Further, the present invention is not limited to these embodiments, but various variations and modifications may be made without departing from the scope of the present invention.

For example, it is assumed that the mirror unit 114* in the second embodiment captures downlink packets received/transmitted by all VMs and downlink packets passing through the NIC 130, and excludes those having equivalent contents, but it is not limited to that. The mirror unit 114* in the second embodiment may capture uplink packets received/transmitted by all VMs and uplink packets passing through the NIC 130, and excludes those having equivalent contents to transmit remaining packets to the NIC 132.

Also, the physical switches 300 and 310 may be integrated into a single physical switch.

Also, OSes or VMs may be arbitrarily placed within the system in the respective embodiments, to which the present invention can be applied as long as multiple VMs exist on an information processing apparatus (physical server).

Also, the physical server has two NICs, one for receiving/transmitting packets with an external device, and the other for transmitting packets collected by the mirror unit, but the same NIC may cover both packets exchanged with an external device, and packets collected by the mirror unit. In this case, it is preferable to transmit packets collected by the mirror unit so that the packets collected by the mirror unit can be distinguished from the other packets. For example, one may consider to separate a period for transmitting the packets collected by the mirror unit from a period for receiving/transmitting the other packets, or to attach a predetermined identifier to the packets collected by the mirror unit.

INDUSTRIAL USABILITY

The present invention can be used in the computer manufacturing industry, computer software industry, information service provider industry, and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory and configured to
collect data received and transmitted between a plurality of virtual machines within a physical apparatus, the plurality of virtual machines running on the physical apparatus,
output the collected data to an external apparatus,
distinguish the data received and transmitted between the virtual machines within the physical apparatus from data received and transmitted between the virtual machines and the external apparatus,
obtain uplink data at a first interface, the uplink data transferred in a direction approaching one of the virtual machines corresponding to the first interface with the one of the virtual machines being designated as a destination address,
obtain downlink data at a second interface, the downlink data transferred in a direction moving away from one of the virtual machines corresponding to the second interface with the one of the virtual machines being designated as a source address, and
determine one of the uplink data and the downlink data as being the data to collect when all of header identifiers, source addresses, and destination addresses of the uplink data and the downlink data are matched.

2. The information processing apparatus as claimed in claim 1, wherein the processor is further configured to input and output the data received and transmitted between the virtual machines and the external apparatus.

3. The information processing apparatus as claimed in claim 1, wherein the processor is configured to determine data received by a relay unit provided between the virtual machines and the external apparatus, as the data to collect when both a virtual reception port of the relay unit and a virtual transmission port of the relay unit correspond to the virtual machines.

4. An information processing system comprising:
an information processing apparatus including a memory and a processor coupled to the memory and configured to
collect data received and transmitted between a plurality of virtual machines within a physical apparatus, the plurality of virtual machines running on the physical apparatus,
output the collected data to an external apparatus, and
input and output data received and transmitted between the virtual machines and the external apparatus; and
a switch coupled to the processor and configured to
receive from the processor the collected data and the data received and transmitted between the virtual machines and the external apparatus,
copy the data received and transmitted between the virtual machines and the external apparatus, and
output the copied data and the collected data from the processor,
the processor is configured to distinguish the data received and transmitted between the virtual machines within the physical apparatus from the data received and transmitted between the virtual machines and the external apparatus.

5. The information processing system as claimed in claim 4, wherein the switch includes
a first switch configured to transmit a copy of the received and transmitted data to a second switch, and
the second switch configured to output the data received from the first switch and the data received from the processor.

6. A communication data output method, the method being executed by an information processing apparatus, with a plurality of virtual machines running on a physical apparatus of the information processing apparatus, the method comprising:
collecting data received and transmitted between the virtual machines within the physical apparatus; and
outputting the collected data to an external apparatus; the collecting includes
distinguishing the data received and transmitted between the virtual machines within the physical apparatus from data received and transmitted between the virtual machines and the external apparatus,
obtaining uplink data at a first interface, the uplink data transferred in a direction approaching one of the virtual machines corresponding to the first interface with the one of the virtual machines being designated as a destination address,
obtaining downlink data at a second interface, the downlink data transferred in a direction moving away from one of the virtual machines corresponding to the second interface with the one of the virtual machines being designated as a source address, and
determining one of the uplink data and the downlink data as being the data to collect when all of header identifiers, source addresses, and destination addresses of the uplink data and the downlink data are matched.

7. The communication data output method as claimed in claim 6, further comprising inputting and outputting the data received and transmitted between the virtual machines and the external apparatus.

8. The communication data output method as claimed in claim 6, further comprising determining data received by a relay unit provided between the virtual machines and the external apparatus, as the data to collect when both a virtual reception port of the relay unit and a virtual transmission port of the relay unit correspond to the virtual machines.

* * * * *